(12) United States Patent
Sheeder et al.

(10) Patent No.: US 12,243,531 B2
(45) Date of Patent: *Mar. 4, 2025

(54) DETERMINING INPUT FOR SPEECH PROCESSING ENGINE

(71) Applicant: Magic Leap, Inc., Plantation, FL (US)

(72) Inventors: Anthony Robert Sheeder, Fort Lauderdale, FL (US); Colby Nelson Leider, Coral Gables, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,866

(22) Filed: Nov. 10, 2023

(65) Prior Publication Data

US 2024/0087565 A1    Mar. 14, 2024

Related U.S. Application Data

(63) Continuation of application No. 18/148,221, filed on Dec. 29, 2022, now Pat. No. 11,854,550, which is a
(Continued)

(51) Int. Cl.
*G10L 15/22* (2006.01)
*G06F 3/01* (2006.01)
(Continued)

(52) U.S. Cl.
CPC .............. *G10L 15/22* (2013.01); *G06F 3/013* (2013.01); *G10L 15/14* (2013.01); *G10L 15/25* (2013.01);
(Continued)

(58) Field of Classification Search
CPC .......... G06F 3/011; G06F 3/012; G06F 3/013; G06F 3/0346; G06F 3/167; G10L 15/14;
(Continued)

(56) References Cited

U.S. PATENT DOCUMENTS

| 4,158,750 A | 6/1979 | Sakoe |
| 4,852,988 A | 8/1989 | Velez |

(Continued)

FOREIGN PATENT DOCUMENTS

| CA | 2316473 A1 | 1/2001 |
| CA | 2362895 A1 | 12/2002 |

(Continued)

OTHER PUBLICATIONS

European Notice of Allowance dated Jul. 15, 2024, for EP Application No. 20791183.5 nine pages.
(Continued)

*Primary Examiner* — Angela A Armstrong
(74) *Attorney, Agent, or Firm* — Morrison & Foerster LLP

(57) ABSTRACT

A method of presenting a signal to a speech processing engine is disclosed. According to an example of the method, an audio signal is received via a microphone. A portion of the audio signal is identified, and a probability is determined that the portion comprises speech directed by a user of the speech processing engine as input to the speech processing engine. In accordance with a determination that the probability exceeds a threshold, the portion of the audio signal is presented as input to the speech processing engine. In accordance with a determination that the probability does not exceed the threshold, the portion of the audio signal is not presented as input to the speech processing engine.

20 Claims, 14 Drawing Sheets

Related U.S. Application Data continuation of application No. 16/805,337, filed on Feb. 28, 2020, now Pat. No. 11,587,563.

(60) Provisional application No. 62/812,959, filed on Mar. 1, 2019.

(51) Int. Cl.
  *G10L 15/14* (2006.01)
  *G10L 15/25* (2013.01)
  *G10L 15/30* (2013.01)

(52) U.S. Cl.
  CPC ........ *G10L 15/30* (2013.01); *G10L 2015/223* (2013.01); *G10L 2015/227* (2013.01)

(58) Field of Classification Search
  CPC ......... G10L 15/22; G10L 15/25; G10L 15/30; G10L 2015/223; G10L 2015/227; G10L 25/05; G10L 25/51
  See application file for complete search history.

(56) References Cited

U.S. PATENT DOCUMENTS

| | | |
|---|---|---|
| 6,433,760 B1 | 8/2002 | Vaissie |
| 6,491,391 B1 | 12/2002 | Blum et al. |
| 6,496,799 B1 | 12/2002 | Pickering |
| 6,847,336 B1 | 1/2005 | Lemelson |
| 6,943,754 B2 | 9/2005 | Aughey |
| 6,977,776 B2 | 12/2005 | Volkenandt et al. |
| 7,346,654 B1 | 3/2008 | Weiss |
| 7,347,551 B2 | 3/2008 | Fergason et al. |
| 7,488,294 B2 | 2/2009 | Torch |
| 7,587,319 B2 | 9/2009 | Catchpole |
| 7,979,277 B2 | 7/2011 | Larri et al. |
| 8,154,588 B2 | 4/2012 | Burns |
| 8,235,529 B1 | 8/2012 | Raffle |
| 8,611,015 B2 | 12/2013 | Wheeler |
| 8,638,498 B2 | 1/2014 | Bohn et al. |
| 8,696,113 B2 | 4/2014 | Lewis |
| 8,929,589 B2 | 1/2015 | Publicover et al. |
| 9,010,929 B2 | 4/2015 | Lewis |
| 9,274,338 B2 | 3/2016 | Robbins et al. |
| 9,292,973 B2 | 3/2016 | Bar-zeev et al. |
| 9,294,860 B1 | 3/2016 | Carlson |
| 9,323,325 B2 | 4/2016 | Perez et al. |
| 9,715,875 B2 | 7/2017 | Piernot |
| 9,720,505 B2 | 8/2017 | Gribetz et al. |
| 10,013,053 B2 | 7/2018 | Cederlund et al. |
| 10,025,379 B2 | 7/2018 | Drake et al. |
| 10,062,377 B2 | 8/2018 | Larri et al. |
| 10,134,425 B1 | 11/2018 | Johnson, Jr. |
| 10,289,205 B1 | 5/2019 | Sumter |
| 10,839,789 B2 | 11/2020 | Larri et al. |
| 10,971,140 B2 | 4/2021 | Catchpole |
| 11,328,740 B2 | 5/2022 | Lee et al. |
| 11,587,563 B2 * | 2/2023 | Sheeder ............... G06F 3/013 |
| 11,790,935 B2 | 10/2023 | Lee et al. |
| 11,854,550 B2 * | 12/2023 | Sheeder ............... G06F 3/0346 |
| 11,854,566 B2 | 12/2023 | Leider |
| 11,917,384 B2 | 2/2024 | Roach |
| 12,094,489 B2 | 9/2024 | Lee |
| 2001/0055985 A1 | 12/2001 | Matt et al. |
| 2003/0030597 A1 | 2/2003 | Geist |
| 2005/0033571 A1 | 2/2005 | Huang |
| 2005/0069852 A1 | 3/2005 | Janakiraman et al. |
| 2006/0023158 A1 | 2/2006 | Howell et al. |
| 2006/0072767 A1 | 4/2006 | Zhang et al. |
| 2006/0098827 A1 | 5/2006 | Paddock et al. |
| 2006/0178876 A1 | 8/2006 | Sato et al. |
| 2007/0225982 A1 | 9/2007 | Washio |
| 2008/0124690 A1 | 5/2008 | Redlich |
| 2008/0201138 A1 | 8/2008 | Visser et al. |
| 2009/0180626 A1 | 7/2009 | Nakano |
| 2010/0245585 A1 | 9/2010 | Fisher et al. |
| 2010/0323652 A1 | 12/2010 | Visser et al. |
| 2011/0211056 A1 | 9/2011 | Publicover et al. |
| 2011/0213664 A1 | 9/2011 | Osterhout |
| 2011/0238407 A1 | 9/2011 | Kent |
| 2011/0288860 A1 | 11/2011 | Schevciw et al. |
| 2012/0021806 A1 | 1/2012 | Maltz |
| 2012/0130713 A1 | 5/2012 | Shin et al. |
| 2012/0209601 A1 | 8/2012 | Jing |
| 2013/0077147 A1 | 3/2013 | Efimov |
| 2013/0204607 A1 | 8/2013 | Baker, IV |
| 2013/0339028 A1 | 12/2013 | Rosner et al. |
| 2014/0016793 A1 | 1/2014 | Gardner |
| 2014/0194702 A1 | 7/2014 | Tran |
| 2014/0195918 A1 | 7/2014 | Friedlander |
| 2014/0200887 A1 | 7/2014 | Nakadai et al. |
| 2014/0222430 A1 | 8/2014 | Rao |
| 2014/0270202 A1 | 9/2014 | Ivanov et al. |
| 2014/0270244 A1 | 9/2014 | Fan |
| 2014/0337023 A1 | 11/2014 | Mcculloch et al. |
| 2014/0379336 A1 | 12/2014 | Bhatnagar |
| 2015/0006181 A1 | 1/2015 | Fan et al. |
| 2015/0168731 A1 | 6/2015 | Robbins |
| 2015/0310857 A1 | 10/2015 | Habets et al. |
| 2015/0348572 A1 | 12/2015 | Thornburg et al. |
| 2016/0019910 A1 | 1/2016 | Faubel et al. |
| 2016/0066113 A1 | 3/2016 | Elkhatib et al. |
| 2016/0112817 A1 | 4/2016 | Fan et al. |
| 2016/0142830 A1 | 5/2016 | Hu |
| 2016/0165340 A1 | 6/2016 | Benattar |
| 2016/0180837 A1 | 6/2016 | Gustavsson |
| 2016/0216130 A1 | 7/2016 | Abramson et al. |
| 2016/0217781 A1 | 7/2016 | Zhong et al. |
| 2016/0284350 A1 | 9/2016 | Yun et al. |
| 2016/0358598 A1 | 12/2016 | Williams et al. |
| 2016/0379629 A1 | 12/2016 | Hofer et al. |
| 2016/0379632 A1 | 12/2016 | Hoffmeister et al. |
| 2016/0379638 A1 | 12/2016 | Basye et al. |
| 2017/0078819 A1 | 3/2017 | Habets |
| 2017/0091169 A1 | 3/2017 | Bellegarda |
| 2017/0092276 A1 | 3/2017 | Sun et al. |
| 2017/0110116 A1 | 4/2017 | Tadpatrikar et al. |
| 2017/0148429 A1 | 5/2017 | Hayakawa |
| 2017/0270919 A1 | 9/2017 | Parthasarathi et al. |
| 2017/0280239 A1 | 9/2017 | Sekiya |
| 2017/0316780 A1 | 11/2017 | Lovitt |
| 2017/0330555 A1 | 11/2017 | Kawano |
| 2017/0332187 A1 | 11/2017 | Lin |
| 2018/0011534 A1 | 1/2018 | Poulos et al. |
| 2018/0053284 A1 | 2/2018 | Rodriguez et al. |
| 2018/0077095 A1 | 3/2018 | Deyle et al. |
| 2018/0129469 A1 | 5/2018 | Vennström et al. |
| 2018/0227665 A1 | 8/2018 | Elko et al. |
| 2018/0316939 A1 | 11/2018 | Todd |
| 2018/0336902 A1 | 11/2018 | Cartwright et al. |
| 2018/0349946 A1 | 12/2018 | Nguyen |
| 2018/0358021 A1 | 12/2018 | Mistica et al. |
| 2018/0366114 A1 | 12/2018 | Anbazhagan et al. |
| 2019/0129944 A1 | 5/2019 | Kawano |
| 2019/0362741 A1 | 11/2019 | Li et al. |
| 2019/0373362 A1 | 12/2019 | Ansai et al. |
| 2019/0392641 A1 | 12/2019 | Taylor |
| 2020/0027455 A1 | 1/2020 | Sugiyama et al. |
| 2020/0064921 A1 | 2/2020 | Kang et al. |
| 2020/0194028 A1 | 6/2020 | Lipman |
| 2020/0213729 A1 | 7/2020 | Soto |
| 2020/0279552 A1 | 9/2020 | Piersol et al. |
| 2020/0286465 A1 | 9/2020 | Wang et al. |
| 2020/0296521 A1 | 9/2020 | Wexler et al. |
| 2020/0335128 A1 | 10/2020 | Sheeder et al. |
| 2021/0056966 A1 | 2/2021 | Bilac et al. |
| 2021/0125609 A1 | 4/2021 | Dusan et al. |
| 2021/0192413 A1 | 6/2021 | Shirazipour |
| 2021/0306751 A1 | 9/2021 | Roach et al. |
| 2023/0386461 A1 | 11/2023 | Leider |
| 2023/0410835 A1 | 12/2023 | Lee |

(56) References Cited

U.S. PATENT DOCUMENTS

| | | |
|---|---|---|
| 2024/0087587 A1 | 3/2024 | Leider |
| 2024/0163612 A1 | 5/2024 | Roach |

FOREIGN PATENT DOCUMENTS

| | | | |
|---|---|---|---|
| CA | 2388766 A1 | 12/2003 | |
| CN | 105529033 A | 4/2016 | |
| EP | 2950307 A1 | 12/2015 | |
| EP | 3211918 A1 | 8/2017 | |
| JP | S52144205 A | 12/1977 | |
| JP | 06075588 A | 3/1994 | |
| JP | 2000148184 A | 5/2000 | |
| JP | 2002135173 A | 5/2002 | |
| JP | 2005196134 A | 7/2005 | |
| JP | 2008242067 A | 10/2008 | |
| JP | 2010273305 A | 12/2010 | |
| JP | 2013183358 A | 9/2013 | |
| JP | 2014137405 A | 7/2014 | |
| JP | 2014178339 A | 9/2014 | |
| JP | 2016004270 A | 1/2016 | |
| JP | 2017211596 A | 11/2017 | |
| JP | 2018523156 A | 8/2018 | |
| JP | 2018179954 A | 11/2018 | |
| WO | 2014113891 A1 | 7/2014 | |
| WO | 2014159581 A1 | 10/2014 | |
| WO | 2015169618 A1 | 11/2015 | |
| WO | 2016063587 A1 | 4/2016 | |
| WO | 2016151956 A1 | 9/2016 | |
| WO | 2016153712 A1 | 9/2016 | |
| WO | 2017003903 A1 | 1/2017 | |
| WO | 2017017591 A1 | 2/2017 | |
| WO | 2017191711 A1 | 11/2017 | |
| WO | 2019224292 A1 | 11/2019 | |
| WO | 2020180719 A1 | 9/2020 | |
| WO | 2020214844 A1 | 10/2020 | |
| WO | 2022072752 A1 | 4/2022 | |
| WO | 2023064875 A1 | 4/2023 | |

OTHER PUBLICATIONS

Japanese Final Office Action mailed May 31, 2024, for JP Application No. 2021-551538, with English translation, eighteen pages.
Final Office Action mailed Jul. 17, 2024, for U.S. Appl. No. 16/850,965, filed Apr. 16, 2020, seventeen pages.
Backstrom, T. (Oct. 2015). "Voice Activity Detection Speech Processing," Aalto University, vol. 58, No. 10; Publication [online], retrieved Apr. 19, 2020, retrieved from the Internet: URL: https://mycourses.aalto.fi/pluginfile.php/146209/mod_resource/content/1/slides_07_vad.pdf, ; pp. 1-36.
Bilac, M. et al. (Nov. 15, 2017). Gaze and Filled Pause Detection for Smooth Human-Robot Conversations. www.angelicalim.com, retrieved on Jun. 17, 2020, Retrieved from the internet URL: http://www.angelicalim.com/papers/humanoids2017_paper.pdf entire document, eight pages. (20.40).
Chinese Office Action dated Dec. 21, 2023, for CN Application No. 201980050714.4, with English translation, eighteen pages.
European Office Action dated Jun. 1, 2023, for EP Application No. 19822754.8, six pages.
European Search Report dated Nov. 12, 2021, for EP Application No. 19822754.8, ten pages.
European Search Report dated Nov. 21, 2022, for EP Application No. 20791183.5 nine pages.
European Search Report dated Oct. 6, 2022, for EP Application No. 20766540.7 nine pages.
Final Office Action mailed Apr. 10, 2023, for U.S. Appl. No. 16/850,965, filed Apr. 16, 2020, sixteen pages.
Final Office Action mailed Apr. 15, 2022, for U.S. Appl. No. 16/850,965, filed Apr. 16, 2020, fourteen pages.
Final Office Action mailed Aug. 4, 2023, for U.S. Appl. No. 17/254,832, filed Dec. 21, 2020, seventeen pages.
Final Office Action mailed Aug. 5, 2022, for U.S. Appl. No. 16/805,337, filed Feb. 28, 2020, eighteen pages.
Final Office Action mailed Jan. 11, 2023, for U.S. Appl. No. 17/214,446, filed Mar. 26, 2021, sixteen pages.
Final Office Action mailed Jan. 23, 2024, for U.S. Appl. No. 16/850,965, filed Apr. 16, 2020, fifteen pages.
Final Office Action mailed Oct. 6, 2021, for U.S. Appl. No. 16/805,337, filed Feb. 28, 2020, fourteen pages.
Final Office Action mailed Sep. 7, 2023, for U.S. Appl. No. 17/214,446, filed Mar. 26, 2021, nineteen pages.
Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://pdfs.semanticscholar.org/ae54/82c6a8d4add3e9707d780dfb5ce03d8e0120.pdf, twenty-two pages.
International Preliminary Report and Patentability mailed Dec. 22, 2020, for PCT Application No. PCT/US2019/038546, thirteen pages.
International Preliminary Report and Written Opinion mailed Apr. 13, 2023, for PCT Application No. PCT/US2021/53046, filed Sep. 30, 2021, nine pages.
International Preliminary Report and Written Opinion mailed Oct. 28, 2021, for PCT Application No. PCT/US2020/028570, filed Apr. 16, 2020, seventeen pages.
International Preliminary Report and Written Opinion mailed Sep. 16, 2021, for PCT Application No. PCT/US20/20469, filed Feb. 28, 2020, nine pages.
International Search Report and Written Opinion mailed Jan. 24, 2022, for PCT Application No. PCT/US2021/53046, filed Sep. 30, 2021, fifteen pages.
International Search Report and Written Opinion mailed Jul. 2, 2020, for PCT Application No. PCT/US2020/028570, filed Apr. 16, 2020, nineteen pages.
International Search Report and Written Opinion mailed May 18, 2020, for PCT Application No. PCT/US20/20469, filed Feb. 28, 2020, twenty pages.
International Search Report and Written Opinion mailed Sep. 17, 2019, for PCT Application No. PCT/US2019/038546, sixteen pages.
Jacob, R. "Eye Tracking in Advanced Interface Design", Virtual Environments and Advanced Interface Design, Oxford University Press, Inc. (Jun. 1995).
Japanese Notice of Allowance mailed Dec. 15, 2023, for JP Application No. 2020-571488, with English translation, eight pages.
Japanese Office Action dated Jun. 2, 2023, for JP Application No. 2020 571488, with English translation, nine pages.
Kitayama, K. et al. (Sep. 30, 2003). "Speech Starter: Noise-Robust Endpoint Detection by Using Filled Pauses." Eurospeech 2003, retrieved on Jun. 17, 2020, retrieved from the internet URL: http://clteseerx.ist.psu.edu/viewdoc/download?doi=10.1.1.141.1472&rep=rep1&type=pdf entire document, pp. 1237-1240.
Liu, Baiyang, et al.: (Sep. 6, 2015). "Accurate Endpointing with Expected Pause Duration," Interspeech 2015, pp. 2912-2916, retrieved from: a href="https://scholar.google.com/scholar?q=BAIYANG" target="_blank"https://scholar.google.com/scholar?q=BAIYANG/a,+Liu+et+al.:+(September+6,+2015).+Accurate+endpointing+with+expected+pause+duration,&hl=en&as_sdt=0&as_vis=1&oi=scholart.
Non-Final Office Action mailed Apr. 12, 2023, for U.S. Appl. No. 17/214,446, filed Mar. 26, 2021, seventeen pages.
Non-Final Office Action mailed Apr. 13, 2023, for U.S. Appl. No. 17/714,708, filed Apr. 6, 2022, sixteen pages.
Non-Final Office Action mailed Apr. 27, 2023, for U.S. Appl. No. 17/254,832, filed Dec. 21, 2020, fourteen pages.
Non-Final Office Action mailed Aug. 10, 2022, for U.S. Appl. No. 17/214,446, filed Mar. 26, 2021, fifteen pages.
Non-Final Office Action mailed Jun. 23, 2023, for U.S. Appl. No. 18/148,221, filed Dec. 29, 2022, thirteen pages.
Non-Final Office Action mailed Jun. 24, 2021, for U.S. Appl. No. 16/805,337, filed Feb. 28, 2020, fourteen pages.
Non-Final Office Action mailed Mar. 17, 2022, for U.S. Appl. No. 16/805,337, filed Feb. 28, 2020, sixteen pages.
Non-Final Office Action mailed Nov. 17, 2021, for U.S. Appl. No. 16/987,267, filed Aug. 6, 2020, twenty- one pages.
Non-Final Office Action mailed Oct. 4, 2021, for U.S. Appl. No. 16/850,965, filed Apr. 16, 2020, twelve pages.

(56) References Cited

OTHER PUBLICATIONS

Non-Final Office Action mailed Sep. 15, 2023, for U.S. Appl. No. 16/850,965, filed Apr. 16, 2020, fourteen pages.
Non-Final Office Action mailed Sep. 29, 2022, for U.S. Appl. No. 16/850,965, filed Apr. 16, 2020, fifteen pages.
Notice of Allowance mailed Dec. 15, 2023, for U.S. Appl. No. 17/214,446, filed Mar. 26, 2021, seven pages.
Notice of Allowance mailed Jul. 31, 2023, for U.S. Appl. No. 17/714,708, filed Apr. 6, 2022, eight pages.
Notice of Allowance mailed Mar. 3, 2022, for U.S. Appl. No. 16/987,267, filed Aug. 6, 2020, nine pages.
Notice of Allowance mailed Nov. 30, 2022, for U.S. Appl. No. 16/805,337, filed Feb. 28, 2020, six pages.
Notice of Allowance mailed Oct. 12, 2023, for U.S. Appl. No. 18/148,221, filed Dec. 29, 2022, five pages.
Notice of Allowance mailed Oct. 17, 2023, for U.S. Appl. No. 17/254,832, filed Dec. 21, 2020, sixteen pages.
Rolland, J. et al., "High-resolution inset head-mounted display", Optical Society of America, vol. 37, No. 19, Applied Optics, (Jul. 1, 1998).
Shannon, Matt et al. (Aug. 20-24, 2017). "Improved End-of-Query Detection for Streaming Speech Recognition", Interspeech 2017, Stockholm, Sweden, pp. 1909-1913.
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Tonges, R. (Dec. 2015). "An augmented Acoustics Demonstrator with Realtime stereo up-mixing and Binaural Auralization," Technische University Berlin, Audio Communication Group, retrieved on Aug. 22, 2019, Retrieved from the Internet: URL: https://www2.ak.tu-berlin.de/~akgroup/ak_pub/abschlussarbeiten/2015/ToengesRaffael_MasA.pdf, one-hundred pages.
Yoshida, A. et al., "Design and Applications of a High Resolution Insert Head Mounted Display", (Jun. 1994).
International Preliminary Report and Written Opinion mailed Apr. 25, 2024, for PCT Application No. PCT/US2022/078063, seven pages.
International Preliminary Report on Patentability and Written Opinion mailed Apr. 25, 2024, for PCT Application No. PCT/US2022/078073, seven pages.
International Preliminary Report on Patentability and Written Opinion mailed May 2, 2024, for PCT Application No. PCT/US2022/078298, twelve pages.
International Search Report and Written Opinion mailed Jan. 11, 2023, for PCT Application No. PCT/US2022/078298, seventeen pages.
International Search Report and Written Opinion mailed Jan. 17, 2023, for PCT Application No. PCT/US2022/078073, thirteen pages.
International Search Report and Written Opinion mailed Jan. 25, 2023, for PCT Application No. PCT/US2022/078063, nineteen pages.
Japanese Office Action mailed May 2, 2024, for JP Application No. 2021-562002, with English translation, sixteen pages.
Notice of Allowance mailed Jun. 5, 2024, for U.S. Appl. No. 18/459,342, filed Aug. 31, 2023, eight pages.
Japanese Office Action mailed Jan. 30, 2024, for JP Application No. 2021-551538, with English translation, sixteen pages.
European Office Action dated Dec. 12, 2023, for EP Application No. 20766540.7, four pages.
Non-Final Office Action mailed Mar. 27, 2024, for U.S. Appl. No. 16/850,965, filed Apr. 16, 2020, sixteen pages.
Japanese Notice of Allowance mailed Aug. 21, 2024, for JP Application No. 2021-562002, with English translation, 6 pages.
Japanese Notice of Allowance mailed Oct. 28, 2024, for JP Application No. 2021-551538 with English translation, 6 pages.
Non-Final Office Action mailed Aug. 26, 2024, for U.S. Appl. No. 18/418,131, filed Jan. 19, 2024, ten pages.
Non-Final Office Action mailed Nov. 6, 2024, for U.S. Appl. No. 16/850,965, filed Apr. 16, 2020, twenty pages.
Chinese Notice of Allowance dated Nov. 7, 2024, for CN Application No. 201980050714.4, with English translation, 6 pages.
Hatashima, Takashi et al. "A study on a subband acoustic echo chaceller using a single microphone, Institute of Electronics, Information and Communication Engineers technical research report", Feb. 1995, vol. 94, No. 522, p. 1-8 (document showing a well-known technique). Note: An English language abstract can be found on the cover page of this reference.
Japanese Office Action mailed Nov. 7, 2024, for JP Application No. 2023-142856, with English translation, 12 pages.
Notice of Allowance mailed Dec. 11, 2024, for U.S. Appl. No. 18/418,131, filed Jan. 19, 2024, seven pages.

* cited by examiner

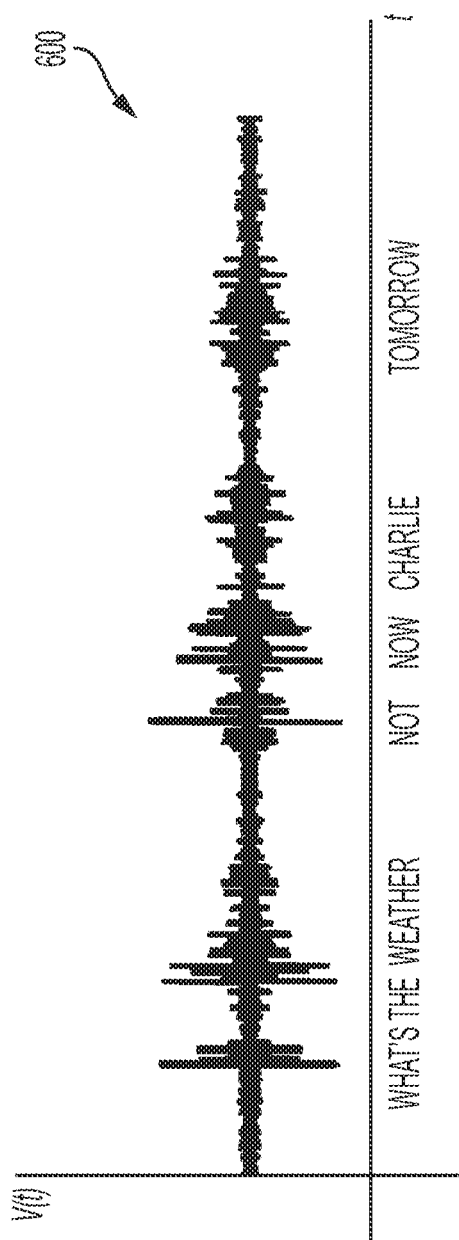
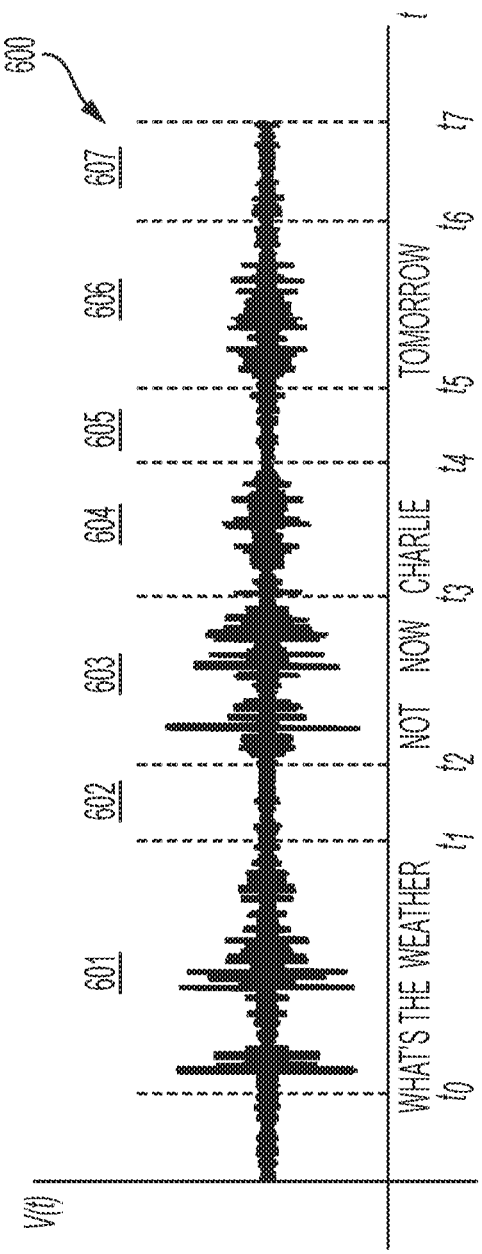
FIG. 6A
FIG. 6B

DETERMINING INPUT FOR SPEECH PROCESSING ENGINE

CROSS-REFERENCE TO RELATED APPLICATION

This application is a continuation of U.S. patent application Ser. No. 18/148,221, filed Dec. 29, 2022, which is a continuation of U.S. patent application Ser. No. 16/805,337, filed Feb. 28, 2020, now U.S. Pat. No. 11,587,563, issued Feb. 21, 2023, which claims priority to U.S. Provisional Application No. 62/812,959, filed on Mar. 1, 2019, the contents of which are incorporated by reference herein in their entirety.

FIELD

This disclosure relates in general to systems and methods for processing speech signals, and in particular to systems and methods for processing a speech signal for presentation to a speech processing engine.

BACKGROUND

Systems for speech recognition are tasked with receiving audio input representing human speech, typically via one or more microphones, and processing the audio input to determine words, logical structures, or other outputs corresponding to that audio input. For example, automatic speech recognition (ASR) systems may generate a text output based on the human speech corresponding to an audio input signal; and natural language processing (NLP) tools may generate logical structures, or computer data, corresponding to the meaning of that human speech. While such systems may contain any number of components, at the heart of such systems is a speech processing engine, which is a component that accepts an audio signal as input, performs some recognition logic on the input, and outputs some text corresponding to that input. (While reference is made herein to speech processing engines, other forms of speech processing besides speech recognition should also be considered within the scope of the disclosure.)

Historically, audio input, such as detected via a microphone, was provided to speech processing engines in a structured, predictable manner. For example, a user might speak directly into a microphone of a desktop computer in response to a first prompt (e.g., "Begin Speaking Now"); immediately after pressing a first button input (e.g., a "start" or "record" button, or a microphone icon in a software interface); or after a significant period of silence. Similarly, a user might stop providing microphone input in response to a second prompt (e.g., "Stop Speaking"); immediately before pressing a second button input (e.g., a "stop" or "pause" button); or by remaining silent for a period of time. Such structured input sequences left little doubt as to when the user was providing input to a speech processing engine (e.g., between a first prompt and a second prompt, or between pressing a start button and pressing a stop button). Moreover, because such systems typically required deliberate action on the part of the user, it could generally be assumed that a user's speech input was directed to the speech processing engine, and not to some other listener (e.g., a person in an adjacent room). Accordingly, many speech processing engines of the time may not have had any particular need to identify, from microphone input, which portions of the input were directed to the speech processing engine and were intended to provide speech recognition input, and conversely, which portions were not.

The ways in which users provide speech recognition input has changed as speech processing engines have become more pervasive and more fully integrated into users' everyday lives. For example, some automated voice assistants are now housed in or otherwise integrated with household appliances, automotive dashboards, smart phones, wearable devices, "living room" devices (e.g., devices with integrated "smart" voice assistants), and other environments far removed from the conventional desktop computer. In many cases, speech processing engines are made more broadly usable by this level of integration into everyday life. However, these systems would be made cumbersome by system prompts, button inputs, and other conventional mechanisms for demarcating microphone input to the speech processing engine. Instead, some such systems place one or more microphones in an "always on" state, in which the microphones listen for a "wake-up word" (e.g., the "name" of the device or any other predetermined word or phrase) that denotes the beginning of a speech recognition input sequence. Upon detecting the wake-up word, the speech processing engine can process the following sequence of microphone input as input to the speech processing engine.

While the wake-up word system replaces the need for discrete prompts or button inputs for speech processing engines, it carries a risk of false positives, such as where the wake-up word is spoken by a user without the intention of activating the speech processing engine, or is inadvertently "spoken" by a television or a music speaker in the vicinity of the speech processing engine. It can be desirable to replace the wake-up word system with a more intelligent way of determining, based on speech input, whether a user intends for that speech to provide input to a speech processing engine—that is, whether the user's speech is "input speech," rather than "non-input speech." This would allow users to interact more naturally with the speech processing engine (e.g., without having to invoke a dedicated wake-up word), and would encourage the use of such systems in everyday environments and situations.

A related problem of speech processing engines that occupy everyday spaces is that these engines may detect large amounts of ambient noise, speech not directed at the engine, or other audio signals that are not intended as input. For example, a speech processing engine in the living room will detect not only a user's deliberate speech processing engine input (e.g., "What's the weather forecast for Tuesday?"), but also sounds and speech from pets, devices (e.g., television speakers), or other people; ambient noises; or portions of the user's speech that are directed to other people in the vicinity. Processing these non-input portions of an audio signal wastes computational resources, and can compromise the accuracy of a speech processing engine—which may already be limited in some uncontrolled environments (e.g., outdoors). It is desirable for a speech processing engine to identify, from microphone input, which portions of the microphone input represent input intended for the speech processing engine (input speech); and to disregard the portions (non-input speech) that do not.

It is further desirable to use sensor-equipped systems, including those that incorporate a wearable head-mounted unit, to improve the ability of speech processing engines to identify and disregard audio input that is not intended for the speech processing engine. Sensor data (e.g., data from individual sensors or data from multiple sensors fused together by an inertial measurement unit) can be used by speech processing engines to help identify and process only those portions of an audio input signal that are input speech, allowing the outputs of those systems to generate more accurate and more reliable results. Sensors of wearable devices, in particular, may be especially useful; for example, such sensors can indicate the position and orientation of a user; the user's eye movements and eye gaze targets; movements of the user's hands; and biometric data (e.g., vital signs such as heart rate and breathing rate). In many cases, these indications can provide a speech recognition system with the same sort of non-verbal cues (such as a user's movements and body language) that humans use to intuitively understand to whom another person is speaking. In addition, wearable systems are well suited for mobile, outdoor applications—precisely the type of applications in which many conventional speech processing engines may perform especially poorly.

BRIEF SUMMARY

Examples of the disclosure describe systems and methods for presenting a signal to a speech processing engine. According to an example method, an audio signal is received via one or more microphones. A portion of the audio signal is identified, and a probability is determined that the portion comprises speech directed by a user of the speech processing engine as input to the speech processing engine. In accordance with a determination that the probability exceeds a threshold, the portion of the audio signal is presented as input to the speech processing engine. In accordance with a determination that the probability does not exceed the threshold, the portion of the audio signal is not presented as input to the speech processing engine.

BRIEF DESCRIPTION OF THE DRAWINGS

FIGS. 6A-6D illustrate examples of processing acoustic speech signals according to some embodiments of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example Wearable System

Figure 1:
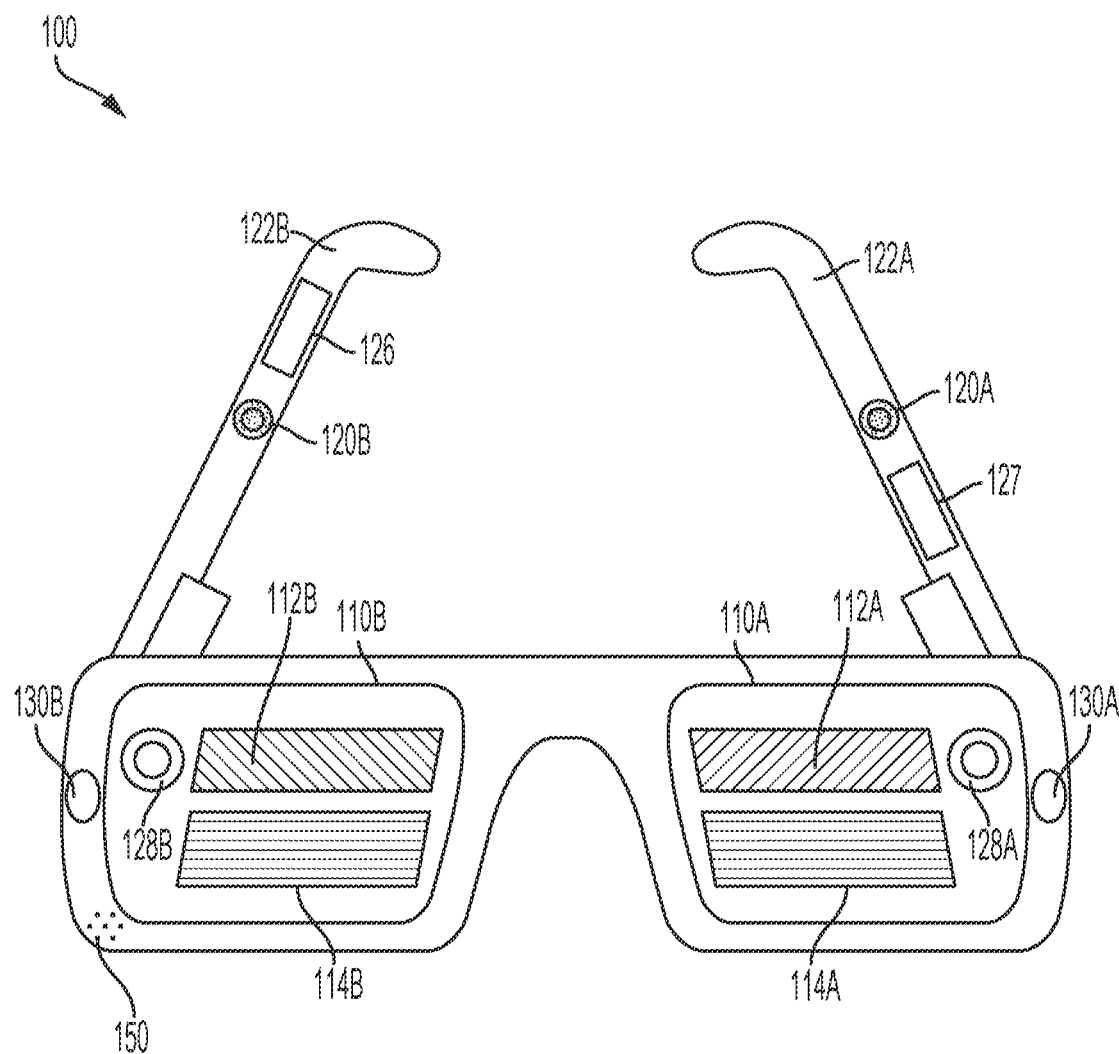
FIG. 1 illustrates an example wearable system according to some embodiments of the disclosure.

FIG. 1 illustrates an example wearable head device 100 configured to be worn on the head of a user. Wearable head device 100 may be part of a broader wearable system that comprises one or more components, such as a head device (e.g., wearable head device 100), a handheld controller (e.g., handheld controller 200 described below), and/or an auxiliary unit (e.g., auxiliary unit 300 described below). In some examples, wearable head device 100 can be used for virtual reality, augmented reality, or mixed reality systems or applications. Wearable head device 100 can comprise one or more displays, such as displays 110A and 110B (which may comprise left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMUs, e.g. IMU 126), acoustic sensors (e.g., microphones 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements)(e.g., eye cameras 128A and 128B). However, wearable head device 100 can incorporate any suitable display technology, and any suitable number, type, or combination of sensors or other components without departing from the scope of the invention. In some examples, wearable head device 100 may incorporate one or more microphones 150 configured to detect audio signals generated by the user's voice; such microphones may be positioned adjacent to the user's mouth. In some examples, wearable head device 100 may incorporate networking features (e.g., Wi-Fi capability) to communicate with other devices and systems, including other wearable systems. Wearable head device 100 may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100 may be coupled to a handheld controller 200, and/or an auxiliary unit 300, as described further below.

Figure 2:
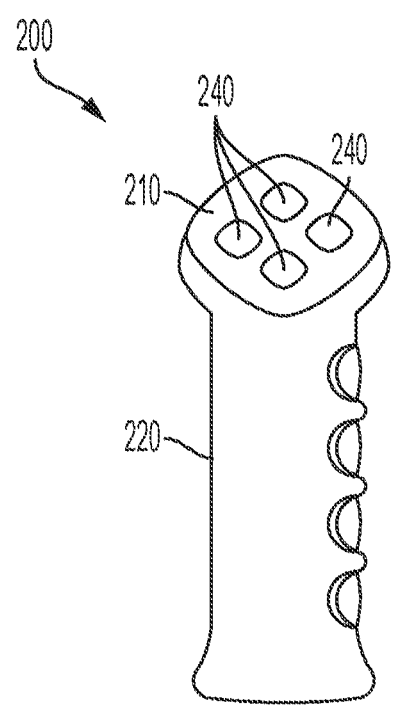
FIG. 2 illustrates an example handheld controller that can be used in conjunction with an example wearable system according to some embodiments of the disclosure.

FIG. 2 illustrates an example mobile handheld controller component 200 of an example wearable system. In some examples, handheld controller 200 may be in wired or wireless communication with wearable head device 100 and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100 can be configured to detect a position and/or orientation of handheld controller 200—which may, by extension, indicate a position and/or orientation of the hand of a user holding handheld controller 200. In some examples, handheld controller 200 may include a processor, a memory, a storage unit, a display, or one or more input devices, such as described above. In some examples, handheld controller 200 includes one or more sensors (e.g., any of the sensors or tracking components described above with respect to wearable head device 100). In some examples, sensors can detect a position or orientation of handheld controller 200 relative to wearable head device 100 or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100).

Figure 3:
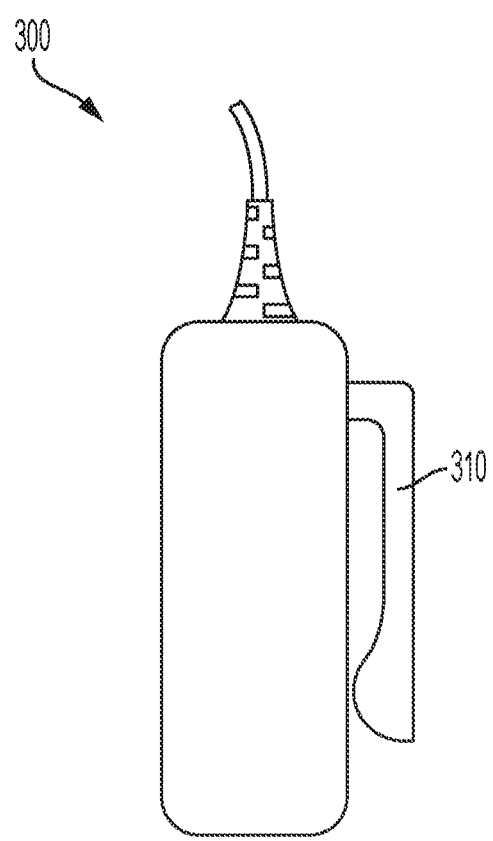
FIG. 3 illustrates an example auxiliary unit that can be used in conjunction with an example wearable system according to some embodiments of the disclosure.

FIG. 3 illustrates an example auxiliary unit 300 of an example wearable system. In some examples, auxiliary unit 300 may be in wired or wireless communication with wearable head device 100 and/or handheld controller 200. The auxiliary unit 300 can include a battery to provide energy to operate one or more components of a wearable system, such as wearable head device 100 and/or handheld controller 200 (including displays, sensors, acoustic structures, processors, microphones, and/or other components of wearable head device 100 or handheld controller 200). In some examples, auxiliary unit 300 may include a processor, a memory, a storage unit, a display, one or more input devices, and/or one or more sensors, such as described above. In some examples, auxiliary unit 300 includes a clip 310 for attaching the auxiliary unit to a user (e.g., a belt worn by the user). An advantage of using auxiliary unit 300 to house one or more components of a wearable system is that doing so may allow large or heavy components to be carried on a user's waist, chest, or back—which are relatively well suited to support large and heavy objects—rather than mounted to the user's head (e.g., if housed in wearable head device 100) or carried by the user's hand (e.g., if housed in handheld controller 200). This may be particularly advantageous for relatively heavy or bulky components, such as batteries.

Figure 4:
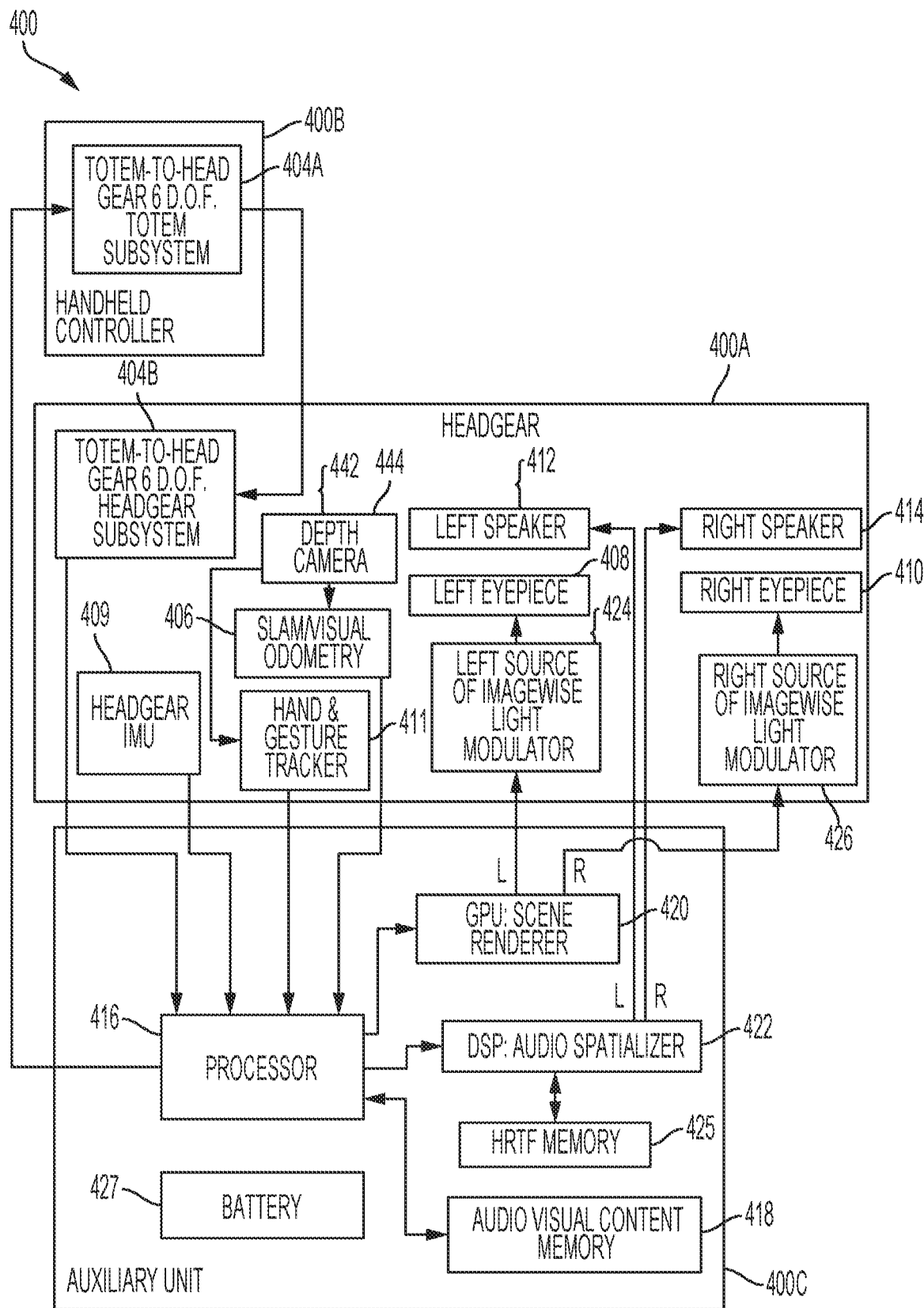
FIG. 4 illustrates an example functional block diagram for an example wearable system according to some embodiments of the disclosure.

FIG. 4 shows an example functional block diagram that may correspond to an example wearable system 400, such as may include example wearable head device 100, handheld controller 200, and auxiliary unit 300 described above. In some examples, the wearable system 400 could be used for virtual reality, augmented reality, or mixed reality applications. As shown in FIG. 4, wearable system 400 can include example handheld controller 400B, referred to here as a "totem" (and which may correspond to handheld controller 200 described above); the handheld controller 400B can include a totem-to-headgear six degree of freedom (6DOF) totem subsystem 404A. Wearable system 400 can also include example headgear device 400A (which may correspond to wearable head device 100 described above); the headgear device 400A includes a totem-to-headgear 6DOF headgear subsystem 404B. In the example, the 6DOF totem subsystem 404A and the 6DOF headgear subsystem 404B cooperate to determine six coordinates (e.g., offsets in three translation directions and rotation along three axes) of the handheld controller 400B relative to the headgear device 400A. The six degrees of freedom may be expressed relative to a coordinate system of the headgear device 400A. The three translation offsets may be expressed as X, Y, and Z offsets in such a coordinate system, as a translation matrix, or as some other representation. The rotation degrees of freedom may be expressed as sequence of yaw, pitch and roll rotations; as vectors; as a rotation matrix; as a quaternion; or as some other representation. In some examples, one or more depth cameras 444 (and/or one or more non-depth cameras) included in the headgear device 400A; and/or one or more optical targets (e.g., buttons 240 of handheld controller 200 as described above, or dedicated optical targets included in the handheld controller) can be used for 6DOF tracking. In some examples, the handheld controller 400B can include a camera, as described above; and the headgear device 400A can include an optical target for optical tracking in conjunction with the camera. In some examples, the headgear device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the handheld controller 400B relative to the headgear device 400A may be determined. In some examples, 6DOF totem subsystem 404A can include an Inertial Measurement Unit (IMU) that is useful to provide improved accuracy and/or more timely information on rapid movements of the handheld controller 400B.

In some examples involving augmented reality or mixed reality applications, it may be desirable to transform coordinates from a local coordinate space (e.g., a coordinate space fixed relative to headgear device 400A) to an inertial coordinate space, or to an environmental coordinate space. For instance, such transformations may be necessary for a display of headgear device 400A to present a virtual object at an expected position and orientation relative to the real environment (e.g., a virtual person sitting in a real chair, facing forward, regardless of the position and orientation of headgear device 400A), rather than at a fixed position and orientation on the display (e.g., at the same position in the display of headgear device 400A). This can maintain an illusion that the virtual object exists in the real environment (and does not, for example, appear positioned unnaturally in the real environment as the headgear device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the headgear device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of headgear device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of headgear device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, microphones 450; and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300 described above). The auxiliary unit 400C may include a battery 427 to power its components and/or to supply power to headgear device 400A and/or handheld controller 400B. Including such components in an auxiliary unit, which can be mounted to a user's waist, can limit the size and weight of headgear device 400A, which can in turn reduce fatigue of a user's head and neck.

While FIG. 4 presents elements corresponding to various components of an example wearable system 400, various other suitable arrangements of these components will become apparent to those skilled in the art. For example, elements presented in FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Speech Processing Engines

Speech recognition systems in general include a speech processing engine that can accept an input audio signal corresponding to human speech (a source signal); process and analyze the input audio signal; and produce, as a result of the analysis, an output corresponding to the human speech. In the case of automatic speech recognition (ASR) systems, for example, the output of a speech processing engine may be a text transcription of the human speech. In the case of natural language processing systems, the output may be one or more commands or instructions indicated by the human speech; or some representation (e.g., a logical expression or a data structure) of the semantic meaning of the human speech. Other types of speech processing systems (e.g., automatic translation systems), including those that do not necessarily "recognize" speech, are contemplated and are within the scope of the disclosure.

Speech recognition systems are found in a diverse array of products and applications: conventional telephone systems; automated voice messaging systems; voice assistants (including standalone and smartphone-based voice assistants); vehicles and aircraft; desktop and document processing software; data entry; home appliances; medical devices; language translation software; closed captioning systems; and others. An advantage of speech recognition systems is that they may allow users to provide input to a computer system using natural spoken language, such as presented to one or more microphones, instead of conventional computer input devices such as keyboards or touch panels; accordingly, speech recognition systems may be particularly useful in environments where conventional input devices (e.g., keyboards) may be unavailable or impractical. Further, by permitting users to provide intuitive voice-based input, speech processing engines can heighten feelings of immersion. As such, speech recognition can be a natural fit for wearable systems, and in particular, for virtual reality, augmented reality, and/or mixed reality applications of wearable systems, in which user immersion is a primary goal; and in which it may be desirable to limit the use of conventional computer input devices, whose presence may detract from feelings of immersion.

Typically, the output of any speech processing engine does not correspond to the source human speech with perfect certainty; because of the many variables that can affect the audio signals provided as input, even sophisticated speech processing engines do not consistently produce perfect text output for all speakers. For example, the reliability of speech processing engines may be highly dependent on the quality of the input audio signal. Where input audio signals are recorded in ideal conditions—for example, in acoustically controlled environments, with a single human speaker enunciating clearly and directly into a microphone from a close distance—the source speech can be more readily determined from the audio signal. In real-world applications, however, input audio signals may deviate from ideal conditions, such that determining the source human speech becomes more difficult. For example, input audio signals may include significant ambient noise, or speech from multiple speakers, in addition to the user; for instance, speech from other people, pets, or electronic devices (e.g., televisions) can be mixed in with the user's speech in the input signal. In addition, even the user's speech may include not only speech intended for the speech processing engine (input speech), but also speech directed at other listeners (such as other people, pets, or other devices). By isolating the input speech from the broader input audio signal, the fidelity of the input processed by the speech processing engine can be improved; and the accuracy of the speech processing engine's output can be improved accordingly.

Identifying and Segmenting Input Speech

The present disclosure is directed to systems and methods for improving the accuracy of a speech processing system by removing, from raw speech signals, portions of those signals that are not directed by the user to the speech processing system. As described herein, such non-input portions can be identified (e.g., classified) based on audio characteristics of the speech signals themselves (e.g., sudden changes in the speech's vocabulary, semantics, or grammar); and/or by using input from sensors associated with wearable devices (e.g., head-mounted devices such as described above with respect to FIG. 1). Such non-input portions may be especially prominent in mobile applications of speech processing, in household usage of speech processing systems, or in applications of speech processing in uncontrolled environments, such as outdoor environments where other voices or ambient noise may be present. Wearable systems are frequently intended for use in such applications, and may therefore be especially susceptible to undirected speech. For example, where some wearable systems are intended for use in uncontrolled environments, a high potential can exist for environmental noise (or speech of other humans) to be recorded along with the target human speech. Sensors of wearable systems (such as described above with respect to FIGS. 1-4) are well suited to solving this problem, as described herein. However, in some examples, as described herein, directivity can be determined based solely on a speech signal, even without the benefit of sensor input.

Figure 5:
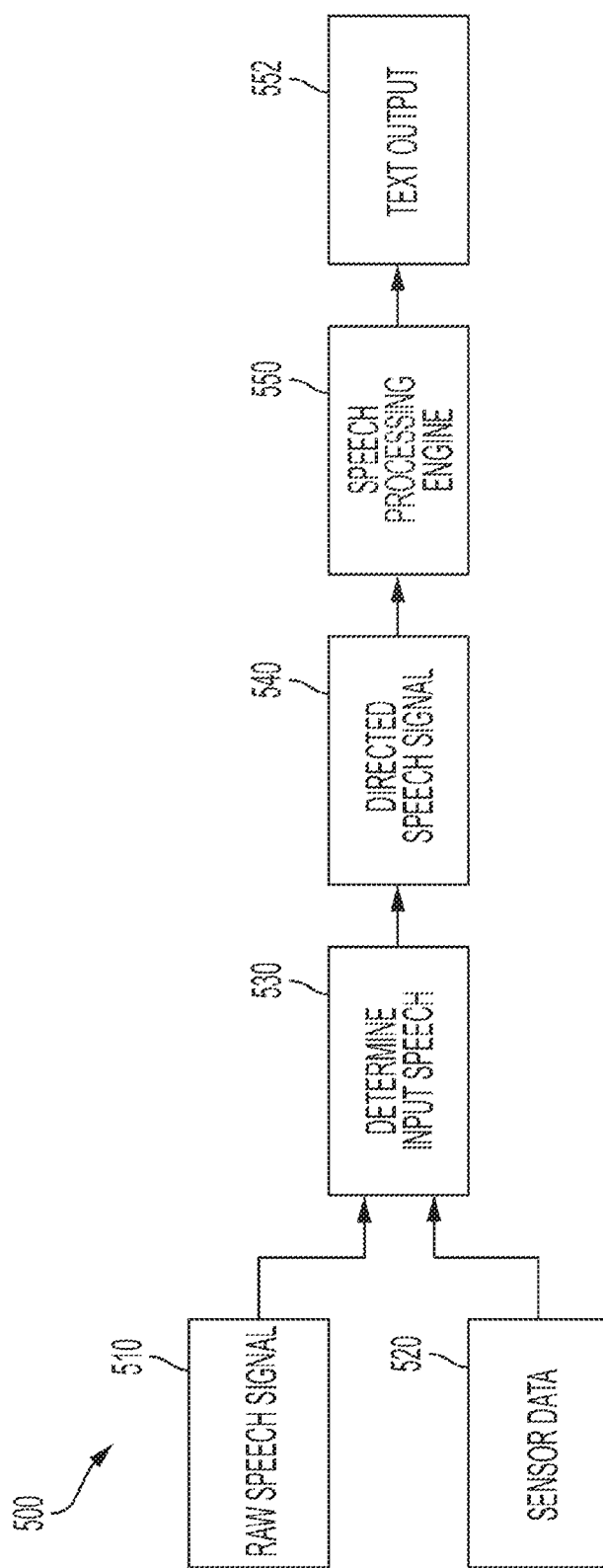
FIG. 5 illustrates a flow chart of an example system for processing acoustic speech signals according to some embodiments of the disclosure.

FIG. 5 illustrates an example system 500, according to some embodiments, in which a speech processing engine 550 produces a text output 552 (such as described above) based on a raw speech signal 510 provided as input. In some examples, raw speech signal 510 can be can be provided as detected by one or more microphones, but in some examples can be provided from a data file (e.g., an audio waveform file), from an audio stream (e.g., provided via a network), or from any other suitable source. In system 500, improved accuracy of text output 552 can be achieved by presenting, as input to speech processing engine 550, a "directed" speech signal 540 that includes only those portions of raw input speech signal 510 that are determined to constitute input speech directed to speech processing engine 550 (as opposed to, for example, extraneous speech such as described above). Directed speech signal 540 can be determined at stage 530 from the raw input speech signal 510 and/or from sensor data 520, which can correspond to data from sensors such as described above with respect to example wearable head device 100 in FIG. 1.

At stage 530, raw speech signal 510 can be divided into individual speech segments; then, for each segment, a probability can be determined that the segment corresponds to input speech that was intended as input for the speech processing engine 550. In some cases, probabilistic modelling or machine learning techniques can indicate this probability for each segment of the raw speech signal 510. Directed speech signal 540 can then be generated by filtering, from raw speech signal 510, the segments of raw speech signal 510 that do not meet a threshold probability of corresponding to input speech (rather than to non-input speech). (As used herein, input speech can include input audio that is provided by a particular user and that is also directed by the user toward a speech recognition system.).

Figure 6C:
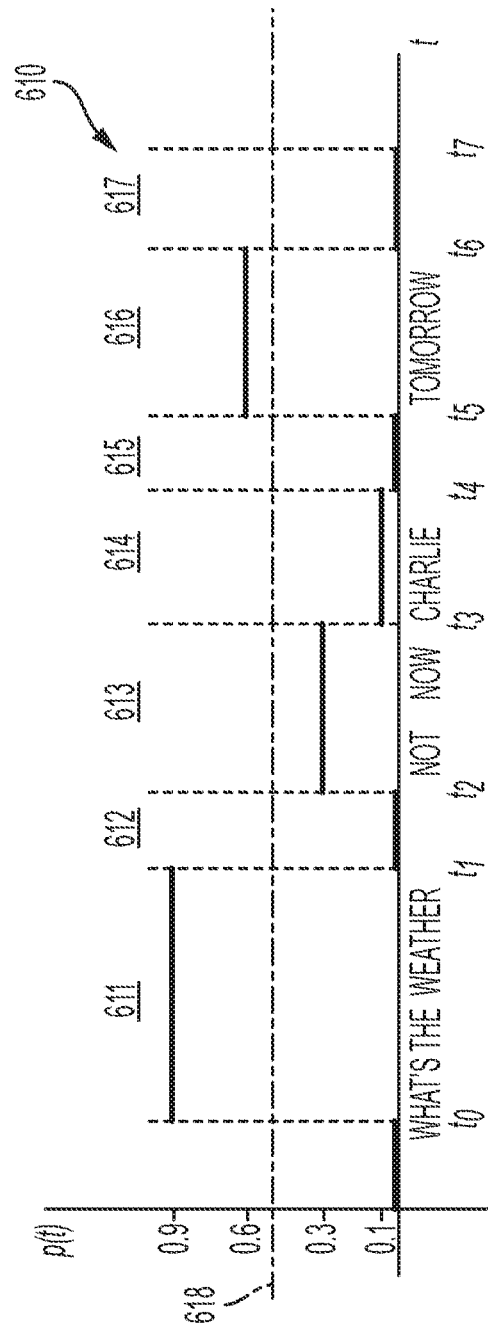
Figure 6D:
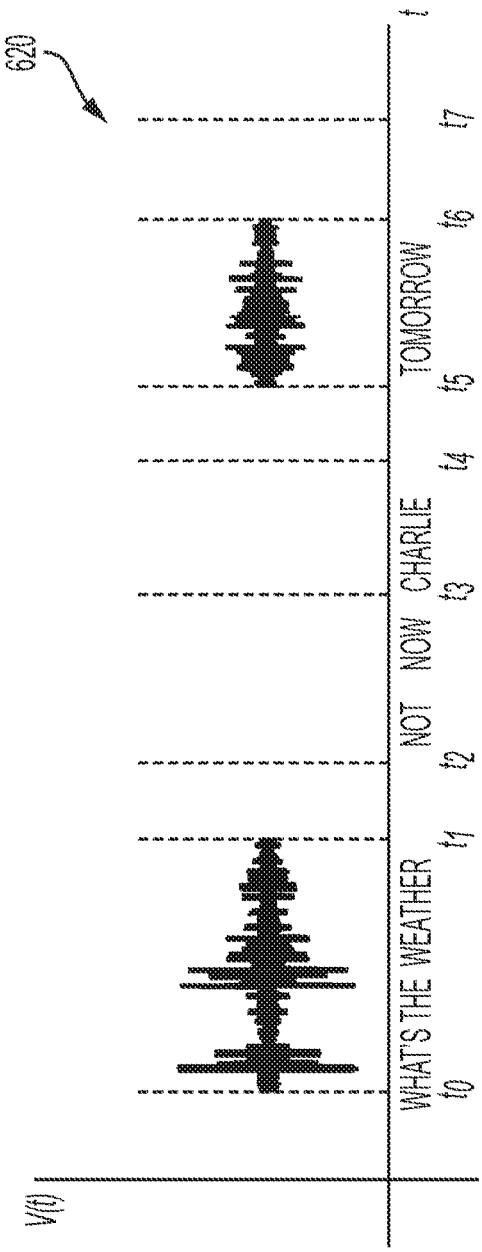

FIGS. 6A-6D illustrate examples of a raw speech signal, a segmented version of the speech signal, a probabilistic model of the raw speech signal (though in some embodiments machine learning techniques may be used), and a directed speech signal generated from the raw speech signal, respectively. FIG. 6A shows an example audio waveform 600 (which may correspond to raw speech signal 510), expressed as an amplitude (e.g., of voltage) V(t) as a function of time, such as might be detected by one or more microphones and/or represented in a waveform audio file. In the example, the waveform 600 corresponds to a user speaking the example sequence, "What's the weather . . . not now, Charlie . . . tomorrow." In the example, the speech sequence includes at least one portion ("What's the weather") intended as a query to the speech processing engine (e.g., speech processing engine 550); at least one portion ("not now, Charlie") intended not as input to speech processing engine, but to another listener (presumably, Charlie); and at least one portion ("tomorrow") that could reasonably belong, semantically, either to the speech recognition input portion ("What's the weather . . . tomorrow") or to the non-input portion ("not now, Charlie . . . tomorrow"). In addition, raw speech signal 510 includes non-verbal noise in between spoken word portions. If raw speech signal 510 were applied directly as input to speech processing engine 550, the system might produce unexpected results, as the presence of non-input speech ("not now, Charlie," and possibly "tomorrow") could interfere with the system's ability to meaningfully respond to the input speech ("What's the weather," possibly with the qualifier "tomorrow"). Higher quality results can be achieved by, in advance of providing input to speech processing engine 550, filtering raw speech signal 600 to generate a directed audio signal that includes speech directed at speech processing engine 550 (e.g., "What's the weather . . . tomorrow") to the exclusion of non-input speech not directed at speech processing engine 550 (e.g., "not now, Charlie"). (As used herein, non-input speech can include input audio that is not provided by a particular user and/or that is not directed toward a speech processing system.)

A segmentation process can divide a raw speech signal into individual segments of audio that can be individually evaluated as corresponding to input speech or non-input speech. FIG. 6B illustrates an example segmentation of raw speech signal 600 into segments of audio. Segments can include phonemes, words, phrases, sentences, utterances, or combinations of any of the above. For each segment, example system 500 can determine whether the segment corresponds to input speech or non-input speech, with the results of the determination used to determine whether the segment should be included or excluded from directed speech signal 540. As shown in FIG. 6B, a segment of signal 600 can be expressed as a region of signal 600 that lies between two points in time (e.g., along the invariant t axis). For example, in the figure, a first segment 601 (e.g., corresponding to "What's the weather") lies between points $t_0$ and $t_1$; a second segment 602 (e.g., corresponding to non-speech, such as background noise) lies between points $t_1$ and $t_2$; a third segment 603 (e.g., corresponding to "not now") lies between points $t_2$ and $t_3$; a fourth segment 604 (e.g., corresponding to "Charlie") lies between points $t_3$ and $t_4$; a fifth segment 605 (e.g., corresponding to non-speech, such as background noise) lies between points $t_4$ and $t_5$; a sixth segment 606 (e.g., corresponding to "tomorrow") lies between points $t_5$ and $t_6$; and a seventh segment 607 (e.g., corresponding to non-speech, such as background noise) lies between points $t_6$ and $t_7$.

The boundaries of such segments can be determined according to one or more suitable techniques. For example, various techniques known in the art can be used to determine boundaries of spoken words or phrases. According to some such techniques, boundaries between segments can be determined based on, for example, periods of relative silence (indicating gaps between "chunks" of speech); changes in pitch or intonation (which may indicate the start or end of a word, phrase, or idea); changes in the cadence of speech (which can indicate the start or end or a word, phrase, or idea, or a transition from one word, phrase, or idea to another); breathing patterns (which can indicate the speaker is about to begin a new word, phrase, or idea); and so on. In some examples, statistical analysis of a speech signal can be useful to identify segment boundaries; for example, portions of the speech signal that represent statistical outliers in the signal (e.g., portions of the speech signal comprising frequency components not commonly found elsewhere in the signal) can signify the start or end of a word, phrase, or idea. Various machine learning techniques can also be used to identify segment boundaries.

In some examples, sensor data 520 can be used to segment a speech signal (e.g., the raw speech signal 510), by indicating potential separation points where a user may be likely to change the target of their speech (e.g., transitioning from speaking to a speech processing engine to speaking to another person in the room). For instance, sensor data may indicate when a user turns their head, changes the focus of their eye gaze, or moves to a different location in the room. Sudden changes in such sensor data can be used to indicate boundaries between speech segments.

The lengths (e.g., average time, or number of syllables) of speech segments may vary. In some examples, segments may generally be on the order of several words, such as may make up a spoken phrase. In some examples, segments may be longer (e.g., constituting one or more full sentences or utterances), or shorter (e.g., constituting individual words, or even individual syllables). As described herein, speech can be included or excluded from directed speech signal 540 on a per-segment basis, such that for each segment, either the entire segment is included, or the entire segment is excluded. Utilizing longer segments can increase the risk that a single segment will include both input speech and non-input speech, which can cause undesirable results: excluding such a segment from directed speech signal 540 would result in failing to present the user's input speech to speech processing engine 550, while including it would present non-input speech to speech processing engine 550—an opposite goal of generating directed speech signal 540. While using shorter segments can reduce this problem, it presents a possible tradeoff in the computational overhead (and accompanying latency) required to process additional segments for a single speech signal. A desirable balance of segment size may be to group, to the extent possible, single related words or thoughts in a single segment, such that the entire segment is, or is not, directed to speech processing engine 550. For example, in example signal 600, "What's the weather" and "not now" each constitute a single chunk of speech that rises or falls together, and may thus be beneficial to group as a single segment. However, segments may be arbitrarily large or arbitrarily small (including segments as small as a single digital audio sample), and the present disclosure is not limited to any particular segmentation size.

In some examples, segmentation may be performed on a prerecorded speech signal, where the entire speech signal is captured before it is segmented. Segmentation may be comparatively more accurate and/or efficient in such examples, as knowledge of the entire speech signal can be used to generate more meaningful speech segments; that is, which portions of the speech signal should be segmented together can be easier to determine when the entire signal is known. However, in some examples, "live" speech may be segmented as it is being detected. Techniques for segmenting prerecorded speech signals may also be used to segment live speech signals (for example, by applying such techniques to buffered chunks of live speech). In some cases, segmentation decisions on live speech may need to be periodically revisited as new speech clarifies the intention of previous speech. Additionally, portions of speech can be flagged for manual review, where they can later be evaluated and corrected manually.

FIG. 6C demonstrates an example probability model 610 corresponding to speech signal 600. In the example, probability model 610 can express, as a function of time t, a probability p(t) that the segment of the corresponding audio signal 600 at time t is user speech directed at speech processing engine 550. (Alternatively, in some examples, p(t) can describe the probability that the segment is not user speech directed at the speech processing engine.) For instance, in the example, at a time $t_{k1}$ that falls between $t_0$ and $t_1$, $p(t_{k1})$ is equal to 0.9, indicating that the portion of speech signal 600 at time $t_{k1}$ ($V(t_{k1})$, e.g., "weather") has a 90% probability of being user speech directed to speech processing engine 550. Similarly, at a time $t_{k2}$ that falls between $t_3$ and $t_4$, $p(t_{k2})$ is equal to 0.1, indicating that the portion of speech signal 600 at time $t_{k2}$ ($V(t_{k2})$, e.g., "Charlie") has a 10% probability of being user speech directed to speech processing engine 550.

As shown in the figure, probability p(t) can be determined on a per-segment basis, such that for a segment that begins at time $t_0$ and ends at time $t_1$, p(t) remains constant between $p(t_0)$ and $p(t_1)$ (that is, the entire segment will have the same probability value). Accordingly, in probability model 610, segment 601 ("What's the weather") has a corresponding probability value 611 of 0.9; segment 603 ("not now") has a corresponding probability value 613 of 0.3; segment 604 ("Charlie") has a corresponding probability value 614 of 0.1; and segment 606 ("tomorrow") has a corresponding probability value 616 of 0.6. In the figure, the remaining segments (i.e., segments 602, 605, and 607, which may correspond to background noise or other non-speech audio) have corresponding probability values (i.e., 612, 615, and 617, respectively) of zero.

Classifying Input Speech

Figure 7A:
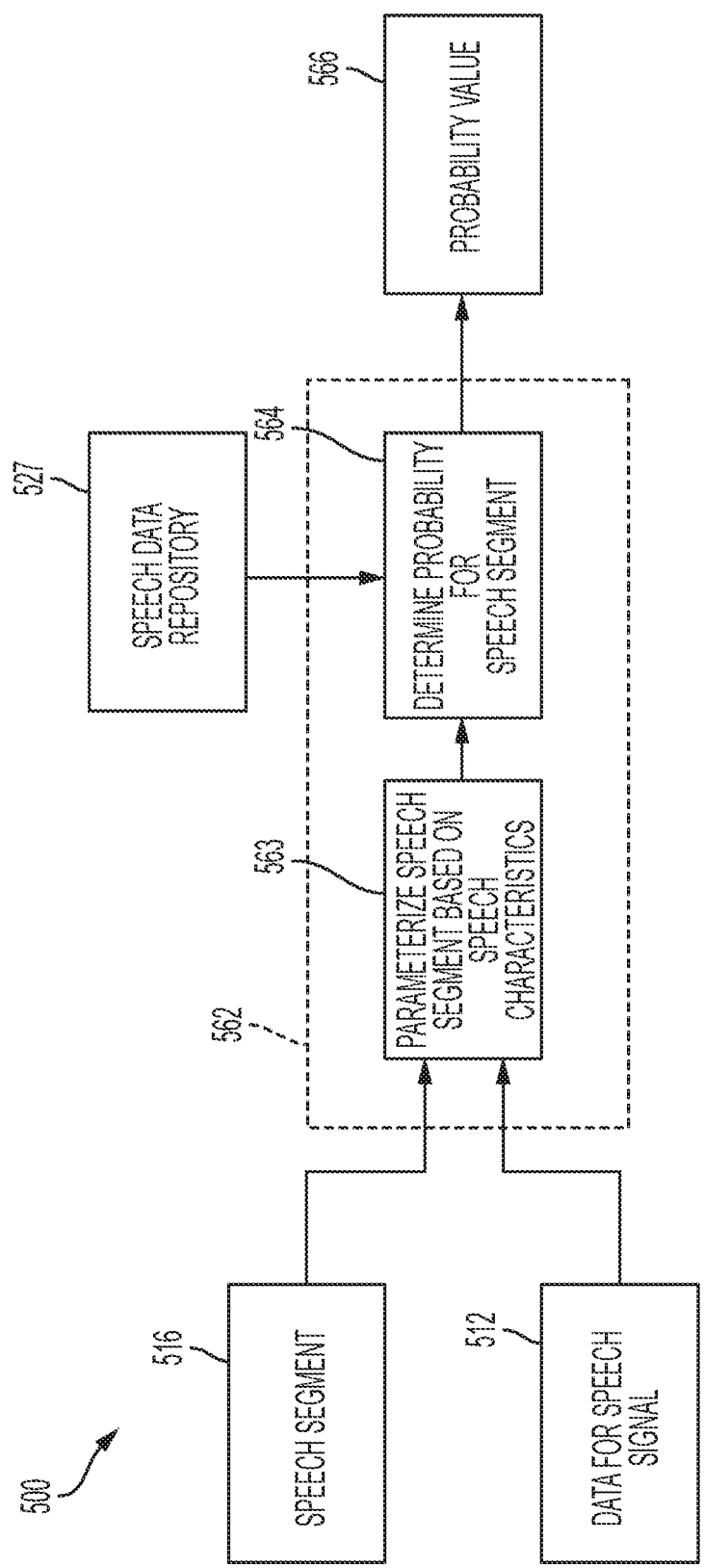
FIGS. 7A-7C illustrate flow charts of example systems for processing acoustic speech signals according to some embodiments of the disclosure.
Figure 7B:
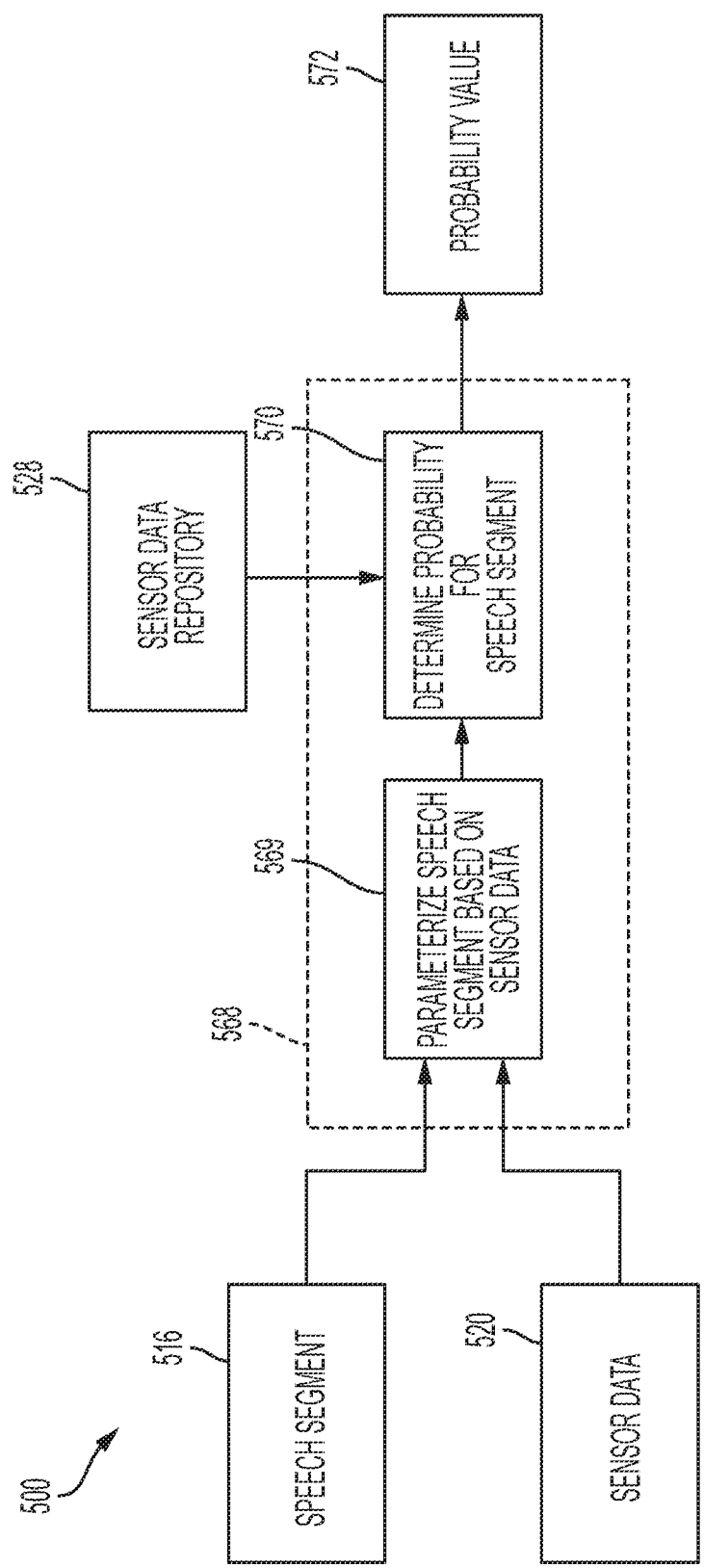
Figure 7C:
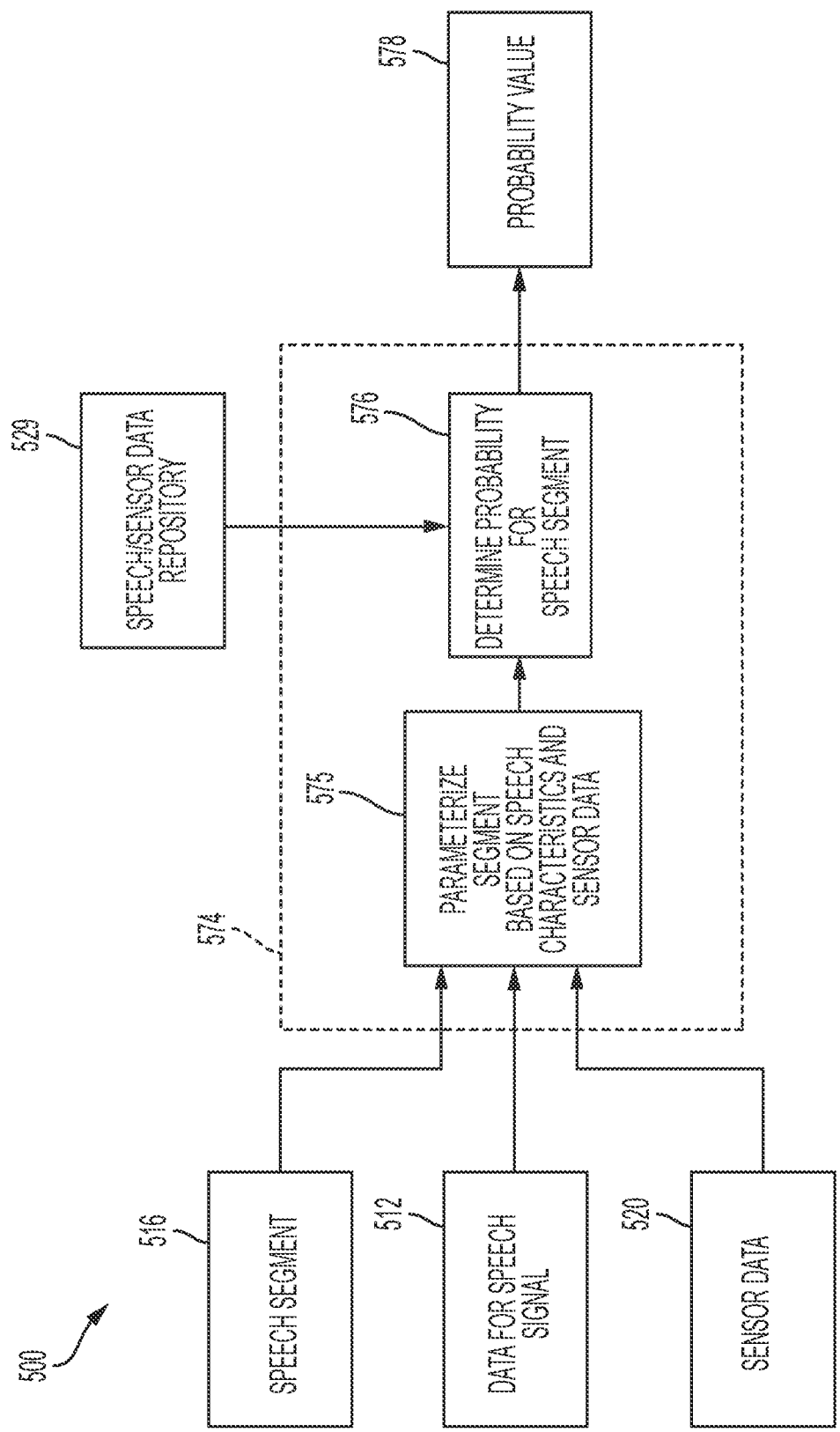

Determining a probability value for a speech segment can be referred to as "classifying" the speech segment, and a module or process for performing this determination (e.g., 562, 568, 574) can be referred to as a "classifier." FIGS. 7A, 7B, and 7C illustrate example classifiers of example system 500 for determining a probability value for a segment of a speech signal (e.g., segments 610 of speech signal 600 described above). This determination can be performed using the speech signal itself (e.g., as shown in FIG. 7A); using sensor data associated with the user (e.g., as shown in FIG. 7B); or using some combination of the speech signal and the sensor data (e.g., as shown in FIG. 7C).

In the example shown in FIG. 7A, speech segment 516, statistical data 512 for the speech signal, and/or a speech data repository 527 are used by classifier 562 to determine a probability value 566 with which the speech segment 516 corresponds to input speech (e.g., user speech directed at a speech recognition system). At stage 563, speech segment 516 can be parameterized/characterized according to one or more parameters, such as by using statistical data 512 of the speech signal. This can facilitate classifying the speech segment based on speech data repository 527. Speech data repository 527 may be stored in a database. A Fourier transform of a time-based speech segment 516 can be performed in order to provide a spectral representation of the speech segment (e.g., a function of frequency indicating the relative prevalence of various frequency parameters in the speech segment 516). In some cases, speech segment 516 can be compared against statistical data 512 to determine a degree to which speech segment 516 deviates from the larger speech signal of which it is a part. For instance, this can indicate levels of (or changes in) volume or component frequencies of the speech segment that can be used at stage 564 to characterize the speech segment. In some examples, aspects of the speaker—for example, the speaker's age, sex, and/or native language—can be used as parameters to characterize the speech segment 516. Other ways in which speech segment 516 can be parameterized, with such parameters used to characterize the speech segment at stage 564, will be apparent to those skilled in the art. As examples, speech segment 516 can be preprocessed with pre-emphasis, spectral analysis, loudness analysis, DCT/MFCC/LPC/MQ analysis, Mel filter bank filtering, noise reduction, band-pass filtering of the signal to the most useful speech range (e.g., 85-8000 Hz), and dynamic range compression. The remaining signal can then be parameterized into a set of time-invariant features (e.g., speaker identification/biometrics, gender identification, mean fundamental frequency, mean loudness) and time-varying feature vectors (e.g., formant center frequencies and bandwidths, fundamental frequency, DCT/MFCC/LPC/MQ coefficients, phoneme identification, consonant identification, pitch contour, loudness contour).

At stage 564 of the example, a probability value 566 is determined that speech segment 516 corresponds to input speech. Probability value 566 can be determined using speech data repository 527. For example, a database including speech data repository 527 can identify, for elements of speech in the database, whether those elements correspond to input speech. Various types of data may be represented in speech data repository 527. In some examples, speech data repository 527 can include a set of audio waveforms corresponding to speech segments; and can indicate, for each waveform, whether the corresponding speech segment belongs to input speech. In some examples, instead of or in addition to audio waveforms, speech data repository 527 can include audio parameters that correspond to the speech segments. Speech segment 516 can be compared with the speech segments of speech data repository 527—for example, by comparing an audio waveform of speech segment 516 with audio waveforms of speech data repository 527, or by comparing parameters of speech segment 516 (such as may be characterized at stage 563) with analogous parameters of speech data repository 527. Based on such comparisons, probability 566 can be determined for speech segment 516. (Methods for creating the data in speech data repository 527 are described below.)

Techniques for determining probability 566 will be familiar to those skilled in the art. For instance, in some examples, nearest neighbor interpolation can be used at stage 564 to compare speech segment 516 to similar speech segments in an N-dimensional space (in which the N dimensions can comprise, for example, audio parameters and/or audio waveform data described above); and to determine probability value 566 based on the relative distances between speech segment 516 and its neighbors in the N-dimensional space. As another example, support vector machines can be used at stage 564 to determine, based on speech data repository 527, a basis for classifying a speech segment as either an input speech segment or a non-input speech segment; and for classifying speech segment 516 (e.g., determining a probability value 566 that the speech segment is input speech) according to that basis. Other suitable techniques for analyzing speech segment 516 and/or speech data repository 527, comparing speech segment 516 to speech data repository 527, and/or classifying speech segment 516 based on speech data repository 527 in order to determine probability 566 will be apparent; the disclosure is not limited to any particular technique or combination of techniques.

In some examples, machine learning techniques can be used, alone or in combination with other techniques described herein, to determine probability value 566. For example, a neural network could be trained on speech data repository 527, and applied to speech segment 516 to determine probability value 566 for speech segment 516. As another example, a genetic algorithm can be used to determine a function, based on speech data repository 527, for determining the probability 566 for speech segment 516. Other suitable machine learning techniques, which will be familiar to those skilled in the art, will be apparent; the disclosure is not limited to any particular technique or combination of techniques.

In some examples, the probability value 566 for speech segment 516 may be influenced by other speech segments of the same speech signal. For instance, users may be unlikely to provide input in short bursts, surrounded by non-input speech (or vice versa); instead, users may be more likely to provide speech recognition input in largely contiguous sequences. That is, all other factors equal, a speech segment 516 is more likely to be an input speech segment if the segments that come immediately before or after it are also input speech segments; and vice versa. In such examples, probabilistic techniques (e.g., Bayesian networks, hidden Markov models) can be used at stage 564, alone or in combination with other techniques described herein, to determine probability 566. Various probabilistic techniques can be suitable for this purpose, and the disclosure is not limited to any particular technique or combination of techniques.

In some examples, speech data repository 527 can be generated by recording a set of speech signals of various speech sources, and identifying, for each portion of each speech signal, a speech target of that portion. For instance, a user could be observed interacting with a group of people, with a speech recognition system present in the same room, as the user's speech (and/or other audio) is recorded. The observer can identify, for each region of the recorded speech, whether that region of speech was directed from the user (and not some other source) as input to the speech recognition system, or to some other target. This information can be apparent to the observer by observing the context in which the user is speaking—commonly, it is easy and intuitive for humans (unlike machines) to determine, based on an observation of a user, whether the user is speaking to a speech recognition system, or to something else. This process can be repeated for multiple users, and in some cases for non-human speakers (e.g., pets, TV speakers, appliances), until a sufficiently large and diverse set of speech data (e.g., audio waveform data, and/or parameters associated with the speech as described above) is generated. From this speech data, individual speech segments can be determined; these speech segments can be associated with the observer's determination of whether or not the corresponding speech is directed by the user to a speech recognition system.

In the example shown in FIG. 7A, as described above, probability value 566 is determined based on the user's own speech as detected by one or more microphones. Accordingly, the predictive value of this system with respect to probability value 566—that is, the degree to which the example of FIG. 7A enables probability value 566 to be determined more accurately than otherwise—is limited by the degree of correlation between the audio characteristics of a speech signal, and whether the speech signal is input speech. The greater the degree of correlation, the more useful the speech signal will be in determining which portions of the signal are input speech. While there may be at least some such correlation between the speech audio and the intended target, correlation may also exist between the intended target of the speech, and sensor data associated with the speaker, such as sensor data 520; accordingly, the overall predictive value of the system can be improved by incorporating sensor data 520, alone or in addition to raw speech signal 510, such as described below with respect to FIGS. 7B and 7C.

FIG. 7B illustrates an example portion of example system 500, in which sensor data 520 is used by classifier 568 to determine a probability value 572 with which the speech segment 516 is input speech. In some examples, as described above, sensor data 520 can correspond to data from sensors such as described above with respect to example wearable head device 100 in FIG. 1. As described above, such a wearable system can include one or more sensors that can provide input about the user and/or the environment of the wearable system. For instance, wearable head device 100 can include a camera (e.g., camera 444 described in FIG. 4) to output visual signals corresponding to the environment; in some examples, the camera can be a forward-facing camera on a head-mounted unit that shows what is currently in front of the user of the wearable system. In some examples, wearable head device 100 can include a LIDAR unit, a radar unit, and/or acoustic sensors, which can output signals corresponding to the physical geometry (e.g., walls, physical objects) of the user's environment. In some examples, wearable head device 100 can include a GPS unit, which can indicate geographic coordinates corresponding to the wearable system's current location. In some examples, wearable head device 100 can include an accelerometer, a gyroscope; and/or an inertial measurement unit (IMU) to indicate an orientation of the wearable head device 100. In some examples, wearable head device 100 can include environmental sensors, such as temperature or pressure sensors. In some examples, wearable head device 100 can include biometric sensors, such as iris cameras; fingerprint sensors; eye tracking sensors (e.g., electrooculography (EOG) sensors) to measure a user's eye movements or eye gaze; or sensors to measure a user's vital signs. In examples where wearable head device 100 includes a head-mounted unit, such orientation can correspond to an orientation of the user's head (and, by extension, the user's mouth and a direction of the user's speech). Other suitable sensors can be included and can provide sensor data 520. Moreover, in some examples, sensors other than those of a wearable system can be utilized as appropriate. For instance, sensors associated with one or more microphones of a speech recognition system (e.g., GPS, IMU) could be used to in conjunction with sensors of a wearable system to determine a relative distance and orientation between the user and the speech recognition system.

In the example shown in FIG. 7B, stage 569 can parameterize/characterize speech segment 516 according to one or more parameters, such as described above with respect to stage 563, with respect to aspects of sensor data 520. This can facilitate classifying the speech segment based on sensor data 520. For instance, stage 569 can perform a Fourier transform of signals of sensor data 520 (e.g., signals describing a user's position or orientation (e.g., from GPS, acoustic, radar, or IMU sensors) as a function of time elapsed during the speech segment) in order to determine a spectral representation of those signals. As examples, speech segment 516 can be characterized according to the user's eye movements (e.g., from EOG sensors), eye gaze targets (e.g., from cameras or EOG sensors), and/or visual targets (e.g., from RGB cameras or LIDAR units). In some examples, sensor data 520 can be compared to a broader range of sensor data (e.g., sensor data captured over a period of several minutes prior to the start of the speech signal) to determine the degree to which sensor data 520 deviates from the broader range of sensor data. Other ways in which sensor data 520 can be parameterized, with such parameters used to characterize the speech segment at stage 564, will be apparent to those skilled in the art. As described above with respect to speech segment 516, speech segment 564 can be preprocessed with pre-emphasis, spectral analysis, loudness analysis, DCT/MFCC/LPC/MQ analysis, Mel filter bank filtering, noise reduction, band-pass filtering of the signal to the most useful speech range (e.g., 85-8000 Hz), and dynamic range compression. The remaining signal can then be parameterized into a set of time-invariant features (e.g., speaker identification/biometrics, gender identification, mean fundamental frequency, mean loudness) and time-varying feature vectors (e.g., formant center frequencies and bandwidths, fundamental frequency, DCT/MFCC/LPC/MQ coefficients, phoneme identification, consonant identification, pitch contour, loudness contour).

At stage 570 of the example, a probability value 572 is determined that speech segment 516 corresponds to input speech. In some approaches, probability value 572 can be determined using a sensor data repository 528, which can include a database identifying, for elements of speech in the database, whether those elements correspond to input speech. In some examples, sensor data repository 528 can include data sets representing sensor measurements (e.g., sequences of a user's head position, orientation, and/or eye gaze over time) corresponding to speech segments; and can indicate, for each data set, whether the corresponding speech segment belongs to input speech. In some examples, instead of or in addition to sensor data sets, sensor data repository 528 can include parameters that correspond to the speech segments. Speech segment 516 can be compared with sensor data repository 528—for example, by comparing raw sensor data 520 with corresponding signals of sensor data repository 528, or by comparing parameters of speech segment 516 (such as may be characterized at stage 569) with analogous parameters of sensor data repository 528. Based on such comparisons, probability 572 can be determined for speech segment 516.

Techniques for determining probability 572 will be familiar to those skilled in the art. For example, the techniques described above with respect to determining probability value 566—e.g., nearest neighbor interpolation, support vector machines, neural networks, genetic algorithms, probabilistic techniques such as Bayesian networks or Markov networks, or any combination of the above—can be applied to sensor data repository 528 and sensor data 520 in an analogous fashion. Other techniques will be apparent, and the disclosure is not limited to any particular technique or combination of techniques.

In some examples, sensor data repository 528 need not be accessed directly by classifier 568 in order to classify speech segment 516 at stage 570. For example, stage 570 can apply one or more rules to determine, based on sensor data 520, a probability value 572 with which speech segment 516 corresponds to input speech. For instance, it can be determined at stage 570, based on sensor data 520 (e.g., data from position and orientation sensors), that the user is facing the microphone (or turned to face the microphone shortly before uttering speech segment 516); and it can then be determined from this information that speech segment 516 is likely to be input speech. Conversely, it can be determined at stage 570 that the user is facing away from the speech processing engine microphone (or recently turned to face away from the microphone), and that speech segment 516 is unlikely to be input speech. This is because humans generally tend to face the object to which their speech is directed, whether that object is a person or a device. Similarly, it can be determined at stage 570, based on sensor data 520 (e.g., data from cameras or EOG sensors), that the user is looking at the microphone (or recently shifted their eye gaze toward the microphone), and that speech segment 516 is likely to be input speech. Conversely, it can be determined that the user is not looking at the microphone, and that the speech segment is unlikely to be input speech. As another example, if sensor data 520 (e.g., camera data) indicates that the user is looking directly at another person while uttering speech segment 516, it can be determined that speech segment 516 is unlikely to be input speech (i.e., that the speech is instead directed at the person the user is looking at). Rules for determining how to classify a probability value 572 based on sensor data can be determined using machine learning techniques familiar to those skilled in the art, such as neural networks or genetic algorithms, using sensor data repository 528 as a training set.

In some examples, sensor data repository 528 can be generated similarly to speech data repository 527 as described above. For instance, data of sensor data repository 528 can be generated by recording a set of speech signals of various speech sources, with accompanying sensor data generated at the same time as the speech signals; and identifying, for each portion of each speech signal, a speech target of that portion. For instance, a user could be observed interacting with a group of people, with a speech recognition system present in the same room, as the user's speech is recorded. The observer can identify, for each region of the recorded speech, whether that region of speech was directed as input from the user to the speech recognition system, or to some other target. From this speech and/or sensor data, individual speech segments can be determined; these speech segments, and their accompanying sensor data, can be associated with the observer's determination of whether or not the corresponding speech is directed by the user to a speech recognition system.

Sensor data 520 can also be used at stage 570 to identify whether or not microphone input belongs to a particular user. For example, the amplitude of a user's speech, as detected by one or more microphones, can be expected to fall within a predictable range that falls off as a function of the distance between the microphone and the user, and that changes as a function of the relative orientation of the user with respect to the microphone (e.g., falls off as the user faces away from the microphone). (In some cases, this range can be determined experimentally for a particular user.) If sensor data 520 (e.g., GPS data, camera data, acoustic data, radar data) indicates that the user is a particular distance from the microphone, a range of expected amplitudes of that user's speech for that particular distance can be determined. Microphone input that falls outside of that amplitude range can be rejected as belonging to a source other than the user. Likewise, other speech characteristics (e.g., high frequency content) can be predicted based on the user's position, orientation, or other sensor data 520; and microphone input that is inconsistent with that sensor data can be rejected. Similarly, microphone input that changes significantly (e.g., in volume or frequency characteristics) while the user's position and orientation remain constant (or vice versa) can be rejected. And conversely, microphone input that is consistent with predicted characteristics of a user's speech, based on sensor data, can reinforce that the microphone input belongs to that user. Other techniques of identifying a source of microphone input, based on sensor data, will be apparent to those skilled in the art.

In FIG. 7B, as described above, probability value 572 is determined based on the user's own speech as detected by one or more microphones. As with the example shown in FIG. 7A and probability value 566, the predictive value of this system with respect to probability value 572 is limited by the degree of correlation between the intended target of a speech signal, and the accompanying sensor data produced alongside the speech signal. The greater the correlation, the more useful the sensor data will be in determining which portions of the signal are input speech. Such a correlation reflects that sensor data (such as from sensors of a wearable system, like those described above) can provide many of the same body language cues that humans use to interpret and contextualize others' speech. For example, humans are accustomed to determining a speaker's intended speech target using the speaker's position (e.g., the speaker's movement, and distance from the listener); orientation (e.g., to whom the speaker is facing); eye gaze (e.g., who the speaker is making eye contact with); gesticulation (e.g., hand and arm movements, facial expressions); and so forth. Many of these body language cues also apply even when the speaker is addressing a device, such as a microphone-enabled speech recognition system. Sensor data can correspond to this body language, such as by providing data indicating the speaker's position, orientation, eye patterns, movement, and so on. Accordingly, using sensor data such as described above can provide valuable information as to the intended target of the corresponding speech.

In some examples, the predictive value of the system can be improved by utilizing both speech data (e.g., as described with respect to FIG. 7A) and sensor data (e.g., as described above with respect to FIG. 7B) that corresponds to the same speech signal. For example, where a speech segment corresponds to both a speech cue (e.g., the user raises their voice) and a sensor cue (e.g., the user quickly turns their head), the two cues combined can provide strong predictive evidence that the speech segment is intended as input from the user to a speech processing engine.

FIG. 7C illustrates an example portion of example system 500 in which analysis data 512 for a speech signal (e.g., speech signal 510), and sensor data 520 are both used by classifier 574 to determine a probability value 578 with which the speech segment 516 is directed by the user to a speech processing engine. Stages of the example system shown can proceed as described above with respect to FIGS. 7A and 7B. For instance, stage 575 can parameterize/characterize speech segment 516 based on speech characteristics determined from speech signal 510 and/or speech signal analysis data 512, such as described above with respect to stage 563 of FIG. 7A; and stage 575 can also parameterize/characterize speech segment 516 based on sensor data 520, such as described above with respect to stage 569 of FIG. 7B. At stage 576, a probability value 578 can be determined for speech segment 516 based on its speech characteristics, such as described above with respect to stage 564 of FIG. 7A; and based further on its corresponding sensor data, such as described above with respect to stage 570 of FIG. 7B. This probability value determination can make use of speech and/or sensor data, such as in a speech/sensor data repository 529. Speech/sensor data repository 529 can include a database including information relating speech data to an intended target of that speech, such as described above with respect to speech data repository 527 of FIG. 7A; and can further include information relating sensor data to an intended target of its corresponding speech, such as described above with respect to sensor data repository 528 of FIG. 7B. Further, speech/sensor data repository 529 can include information relating combinations of speech data and sensor data to an intended speech target. This may be useful in situations where neither the speech data nor the sensor data itself is independently predictive of an intended speech target, but the combination of the two correlates strongly to an intended speech target and has greater predictive value.

Generating a Probability Model

Figure 8:
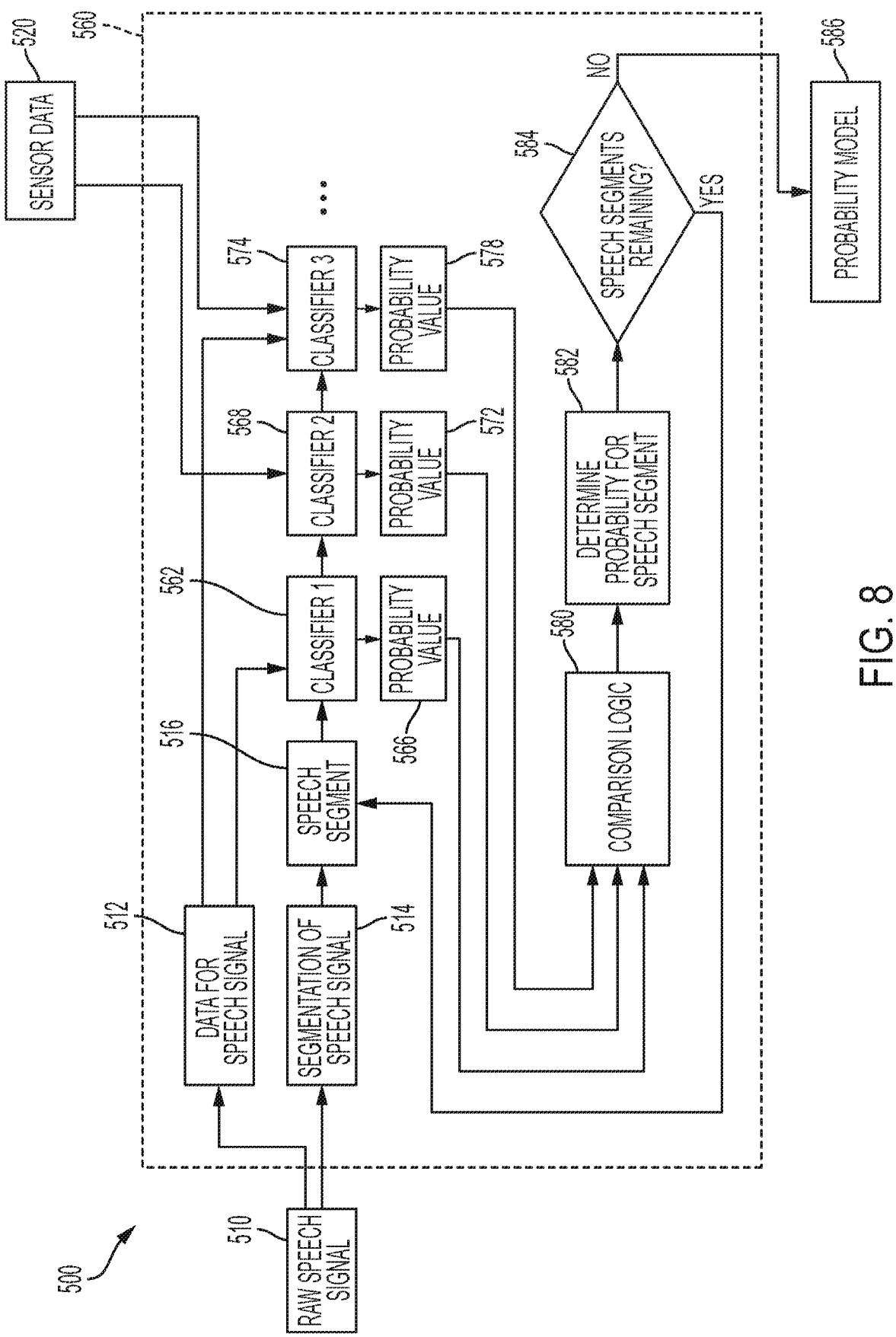
FIG. 8 illustrates a flow chart showing portions of an example system for processing acoustic speech signals according to some embodiments of the disclosure.

FIG. 8 is a flow chart showing a portion of example system 500, illustrating an example of generating a probability model 586 from a raw speech signal 510, according to some embodiments. In FIG. 8, stage 560 generates a probability model 586 (which may correspond to probability model 610, described above with respect to FIG. 6C) from a raw speech signal 510 (which may correspond to signal 600, described above with respect to FIGS. 6A-6B) and sensor data 520. At stage 560, statistical data 512 for the speech signal (e.g., representing statistical analysis of speech signal 510 such as described above) can be generated according to techniques familiar to those skilled in the art. At stage 514 of stage 560, speech signal 510 can be segmented into individual speech segments 516, such as described above with respect to FIGS. 6A-6D. For each speech segment 516, one or more classifiers (e.g., 562, 568, 574 described above) can be applied to generate a probability value, corresponding to the probability that the segment is input speech. In the example shown in FIG. 8, three classifiers are applied: a first classifier (562) generates a first probability value 566 based on the speech segment 516 and speech data 512, such as described above with respect to FIG. 7A; a second classifier (568) generates a second probability value 572 based on the speech segment 516 and sensor data 520, such as described above with respect to FIG. 7B; and a third classifier (574) generates a third probability value 578 based on the speech segment 516, speech data 512, and sensor data 520, such as described above with respect to FIG. 7C. However, in some examples, only one classifier (e.g., classifier 574) need be used; and in some examples, additional classifiers beyond the three described here may be utilized to generate additional respective probability values. In some cases, different classifiers can apply different metrics to determine respective probability values.

In some examples where multiple classifiers are used to determine multiple respective probability values for speech segment 516—such as the example shown in FIG. 8, where classifiers 562, 568, and 574 are used to generate probability values 566, 572, and 578, respectively—it may be necessary to determine an overall probability 582 for speech segment 516, based on the individual probability values generated by their respective classifiers. In such examples, comparison logic 580 can be used to mediate among the individual probability values to determine overall probability 582. In some examples, comparison logic 580 may compute overall probability 582 as an average of individual probabilities (e.g., 566, 572, 578). In some examples, comparison logic 580 may compute overall probability 582 as a weighted average of the individual probabilities, weighted for example by the fidelity of the input data (e.g., speech data 512, sensor data 520). Other suitable techniques that can be employed by comparison logic 580 will be familiar to those skilled in the art, and the disclosure is not limited to any such technique or combination of techniques. Example techniques for combining the outputs of multiple classifiers include ensemble learning; Bayes optimal classifier, bagging (bootstrap aggregating), boosting techniques (e.g., AdaBoost); bucket of models; and stacking.

Once a probability value for a speech segment 516 has been determined, such as described above, the process of determining a probability value can repeat (stage 584) for any remaining speech segments 516. For example, speech signal 600, described above with respect to FIGS. 6A-6D, can be divided into seven speech segments (601 through 607), such as described above; if this speech signal 600 were provided as input 510 to the system shown in FIG. 8, each of stages 562, 568, and 574 might be applied to each of the seven speech segments, resulting in a probability value 582 for each of the segments. Once a probability value has been determined for each speech segment 516, the probability values can be used to generate a probability model 586. As described above, probability model 586 can indicate a probability value for each speech segment of a speech signal. For example, in FIG. 6C, probability model 610 indicates a probability value for each speech segment of speech signal 600. Generating probability model 586 for a speech signal can include expressing a probability value as a function of elapsed time of the speech signal; with such a model, such as shown as model 610 in FIG. 6C, a time t can be applied as input to the model, and the model will indicate the probability that the portion of the speech signal corresponding to time t (e.g., the portion of speech signal 600 after t seconds have elapsed) is directed as input to a speech processing engine. However, other suitable implementations of probability model 586 will be apparent and are within the scope of the disclosure.

Determining a Directed Speech Signal

Figure 9:
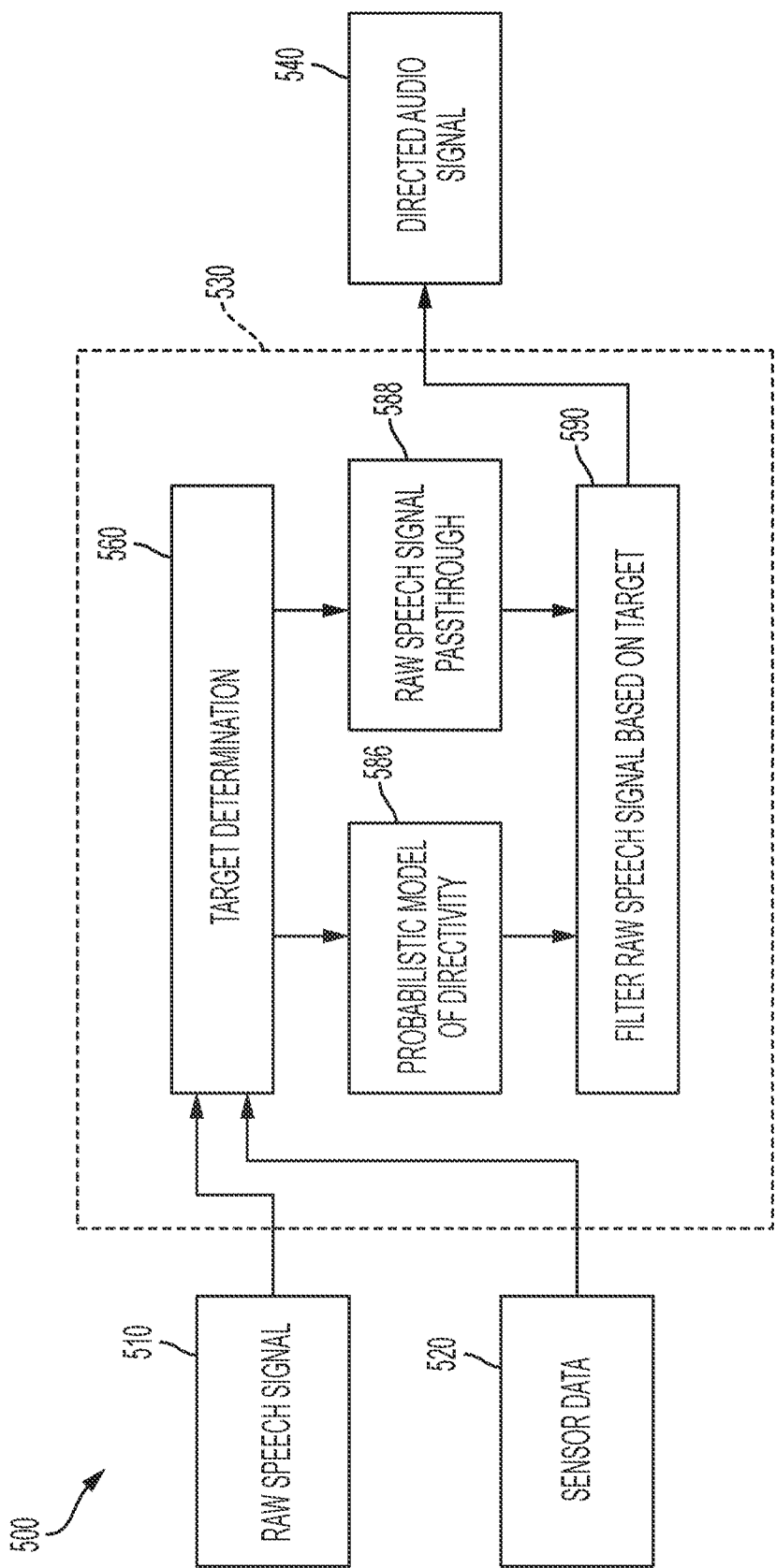
FIG. 9 illustrates a flow chart showing portions of an example system for processing acoustic speech signals according to some embodiments of the disclosure.

FIG. 9 illustrates a portion of example system 500, by which system 500 determines a directed speech signal 540 from raw speech signal 510 and/or sensor data 520, such as by using probability model 586 described above. As shown in FIG. 9, at stage 530, system 500 can generate a directed audio signal 540, which can be an input speech signal to a speech processing engine that includes speech directed by a user to the speech processing engine, while excluding speech not directed by the user to the speech processing engine. Directed audio signal 540 can correspond to signal 620 described above with respect to FIG. 6D. An example of stage 530 generating directed audio signal 540 can proceed as follows with reference to FIG. 9. At stage 560, raw speech signal 510 and/or sensor data 520 can be used to determine, for each of one or more segments of raw speech signal 510, a probability that the segment corresponds to speech directed by the user as input to a speech processing engine. An example implementation of stage 560 is described above with respect to FIG. 8. As described above, the output of target determination stage 560 can be represented as probability model 586, which can express, for example as a function of elapsed time, the probability that a portion of speech signal 510 is user speech directed at the speech processing engine. For example, model 586 can be a mathematical function expressing, for each time t of a raw speech signal having one or more segments, the probability that a segment of that raw speech signal corresponding to that time t is directed at the speech processing engine. As shown in the example in FIG. 9, stage 560 can also output a passthrough signal 588, which may be a buffered signal corresponding to the raw speech signal 510 provided to target determination stage 560.

At stage 590 of the example in FIG. 9, the raw speech signal (e.g., passthrough signal 588) can be filtered based on the probabilistic model 586, such that segments of the raw speech signal 510 that correspond, with a sufficiently high probability, to input speech can be included in directed audio signal 540; and conversely, segments of raw speech signal 510 that do not correspond to input speech can be excluded from directed audio signal 540. Stage 590 can employ a threshold probability value to serve as a cutoff to determine what constitutes a sufficiently high probability for an audio segment to be included in directed audio signal 540. For example, as described above, FIG. 6C illustrates a probability model 610 that corresponds to the raw speech signal 600 shown in FIGS. 6A and 6B. As described above with respect to FIG. 6C, probability model 610 indicates, for each of speech segments 601 through 607 of speech signal 600, a probability that the speech segment corresponds to input speech. In FIG. 6C, threshold value 618 is a value of 0.5; however, other threshold values can be used as appropriate. At stage 590, speech segments with corresponding probability values that meet or exceed threshold value 618 (e.g., speech segments 601 and 606) could be included in directed audio waveform 540; and segments whose corresponding probability values do not meet threshold value 618 (e.g., speech segments 602, 603, 604, 605, and 607) could be excluded from directed audio waveform 540. The result would be the audio waveform 620 shown in FIG. 6D, in which only speech segments with sufficiently high probability ("What's the weather" and "tomorrow") are included in the waveform 620, and remaining segments are excluded. Compared to providing the raw speech signal 600 to the speech recognition system, providing audio waveform 620 as input to the speech recognition system promotes accuracy and computational efficiency, because the speech recognition system does not need to waste computational resources on irrelevant speech (or other audio) that carries a risk of generating erroneous results.

Training Classifiers

Figure 10:
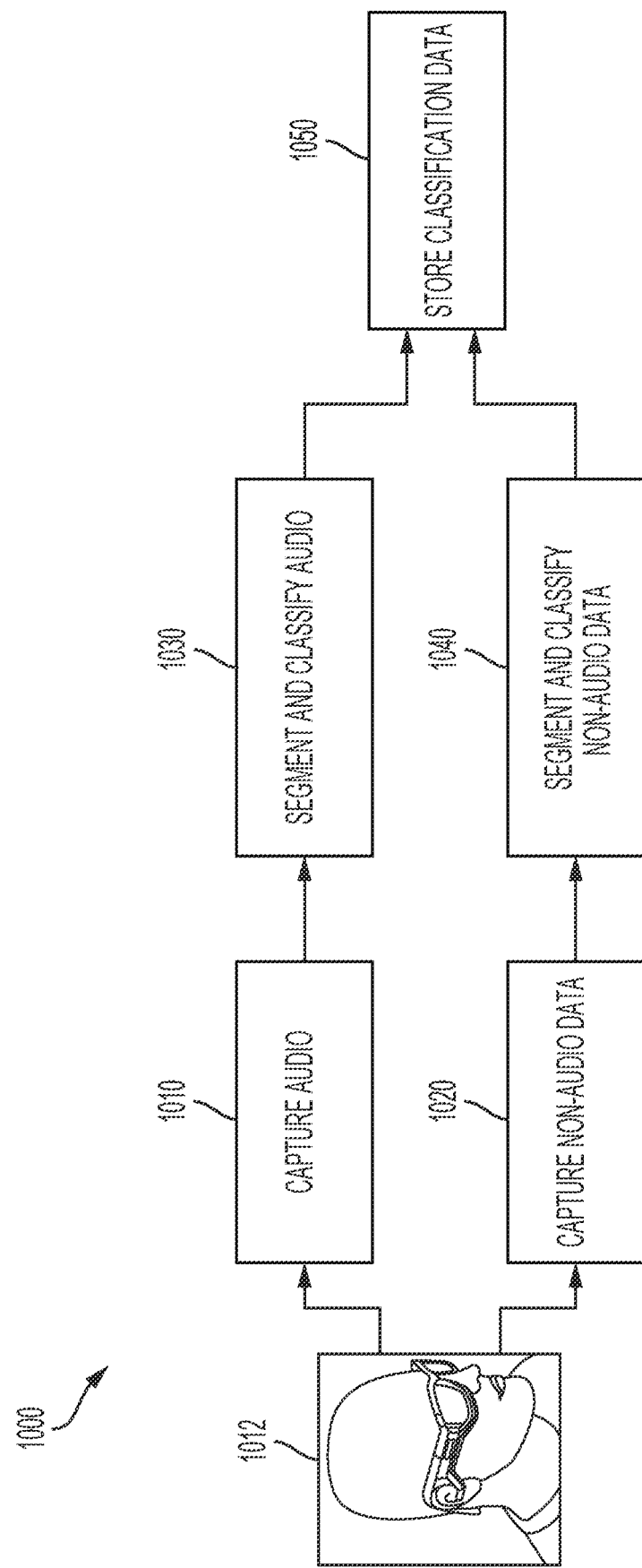
FIG. 10 illustrates a user interacting with one or more recipients according to some embodiments of the disclosure.

FIG. 10 illustrates an example process 1000 for capturing audio and non-audio classifier training data, according to one or more examples of the disclosure. Process 1000 can be applied to a human test subject 1012, interacting (as a user might) with a speech processing engine (e.g., as included in a device with an integrated voice assistant). One or more microphones and one or more sensors can be configured to capture audio data and non-audio data (e.g., sensor data), respectively, from test subject 1012. In some embodiments, the non-audio data may be non-microphone sensor data such as, for example, inertial measurement unit data, visual data, and the like. At step 1010 of the process, raw audio data of the voice of test subject 592 can be captured via the one or more microphones. Similarly, at step 1020, non-audio data of the test subject can be captured via the one or more sensors. In some cases, test subject 1012 can be equipped with a single device, such as a wearable head device such as described above, that can include one or more microphones and one or more sensors. These microphones and sensors can be configured to for capturing the audio data at step 1010 and the non-audio data at step 1020, respectively. Steps 1010 and 1020 can be performed simultaneously.

At step 1030, the audio captured at step 1010 can be segmented and tagged as either input speech or non-input speech. This may be an automated process, a manual process, or some combination thereof. For example, audio data captured at step 1010 can be presented to a voice-activity detector (VAD) or to a human "tagger" observing test subject 1012, and the audio data can be manually separated by the tagger into individual phrases or portions thereof. The tagger can then, based on the tagger's observation of test subject 1012 interacting with the speech recognition engine, manually identify each phrase as input speech or non-input speech. In some cases, the tagger can annotate each phrase with various metadata (e.g., an intended recipient for each phrase, or the audio source of each phrase). Other metadata entered by the tagger can include aspects about the speaker (e.g., the speaker's age, sex, and/or native language). In some examples, the tagger can also segment and tag non-speech audio (e.g., background noise and/or speech from people other than the speaker).

Similarly, at step 1040, non-audio data captured at step 1020 can also be segmented and tagged as either being directed to the speech processing engine, or not. In some examples, a human tagger can identify and/or isolate non-audio data (e.g., sensor data) associated with individual phrases spoken by test subject 1012, described above. In some cases, the tagger can manually associate non-audio data with audio data to which it corresponds. In some examples, non-audio data can be automatically associated with each phrase, based on start and end times of segmented and classified phrases from step 1030. In some examples, non-audio data can include information about a user's head pose, gaze, gestures, location relative to target recipient phrases, or any other sensor data captured.

At step 1050, the audio captured at step 1010, the segmented and tagged phrases from step 1030 (e.g., input speech and non-input speech, including background noise or non-speech audio), the non-audio data captured at step 1020, and/or the segmented and tagged non-audio data from step 1040 can be stored in a repository for classifier training. For example, speech data repository 527 described above can store audio from step 1010 and/or phrases from step 1030; sensor data repository 528 can store non-audio data from step 1020 and/or step 1040; and speech/sensor data repository 529 can store any of the above. In some examples, the audio captured at step 1010 and/or the segmented and tagged phrases from step 1030 are stored separately from the non-audio data captured step 1020, and/or the segmented and tagged non-audio data from step 1040 (e.g., audio data and non-audio data are stored in separate databases). The stored audio data and/or non-audio data can be used to train classifiers, such as described above.

In some embodiments, audio and/or non-audio characteristics can be extracted from the input speech, non-input speech, or non-speech (e.g., background noise) stored in the one or more databases from step 1050 of FIG. 10. Examples of audio characteristics can include levels of (or changes in)

volume (or signal amplitude), pre-vocalization hesitation, intra utterance hesitation, disfluency (e.g., stuttering, repetition), speech rate, syntax, grammar, vocabulary, length of phrase (e.g., duration, word count), pitch (e.g., fluctuation and contour), and/or prosody. Examples of non-audio characteristics that can be extracted from non-audio data include gestures, gaze (and changes thereto), head pose (and changes thereto), and position (e.g., distance and orientation) to physical and/or virtual objects (and changes thereto). In some examples, a Fourier transform of each speech and/or non-speech segment (e.g., each audio and/or non-audio segment corresponding to input speech, non-input speech, and/or non-speech) is stored in step 1050 of FIG. 10 (e.g., both input speech and non-input speech) and provides a spectral representation of each speech segment (e.g., a function of frequency indicating the relative prevalence of various frequency parameters in the speech segment). Other methods of extracting time, frequency, and combined time-frequency parametric representations of audio and non-audio data will be familiar to those skilled in the art. In some examples, the extracted audio and/or non-audio characteristics can be stored with the corresponding input speech, non-input speech, and/or non-speech.

In some embodiments, the segmented and annotated audio data and non-audio data captured through process 1000 of FIG. 10 (e.g., the input speech, non-input speech, and/or non-speech with corresponding metadata) can be fed into one or more classifiers for training purposes, such as described above. By running sample classes of input speech, non-input speech, and non-speech through one or more classifiers, the one or more classifiers can be trained to recognize input speech, non-input speech, and/or non-speech. In some examples, a majority subset (e.g., 60%) of the segmented and annotated audio data and non-audio data are run through the one or more classifiers and a minority subset or remaining (e.g., 40%) segmented and annotated audio data and non-audio data are used to evaluate the one or more classifiers. Evaluation techniques will be familiar to those skilled in the art. In some embodiments, these classifiers can be further trained by enabling users to confirm or reject classifications.

As described above, one or more classifiers (e.g., naive Bayes classifiers, support vector machines, k-nearest neighbor classifiers, AdaBoost classifiers, decision trees, or artificial neural networks) to distinguish between input speech and non-input speech. These classifiers can be trained to recognize audio characteristics and non-audio characteristics associated with input speech and/or non-input speech for improved speech processing. A method to train classifiers in accordance with the disclosure can include capturing audio and/or non-audio data; extracting audio and/or non-audio characteristics of input speech and non-input speech; training one or more classifiers, for example, using machine learning techniques, and/or, in some examples, updating the classifiers for improved input speech identification (e.g., by confirming and/or rejecting classifications), as described below.

Figure 11:
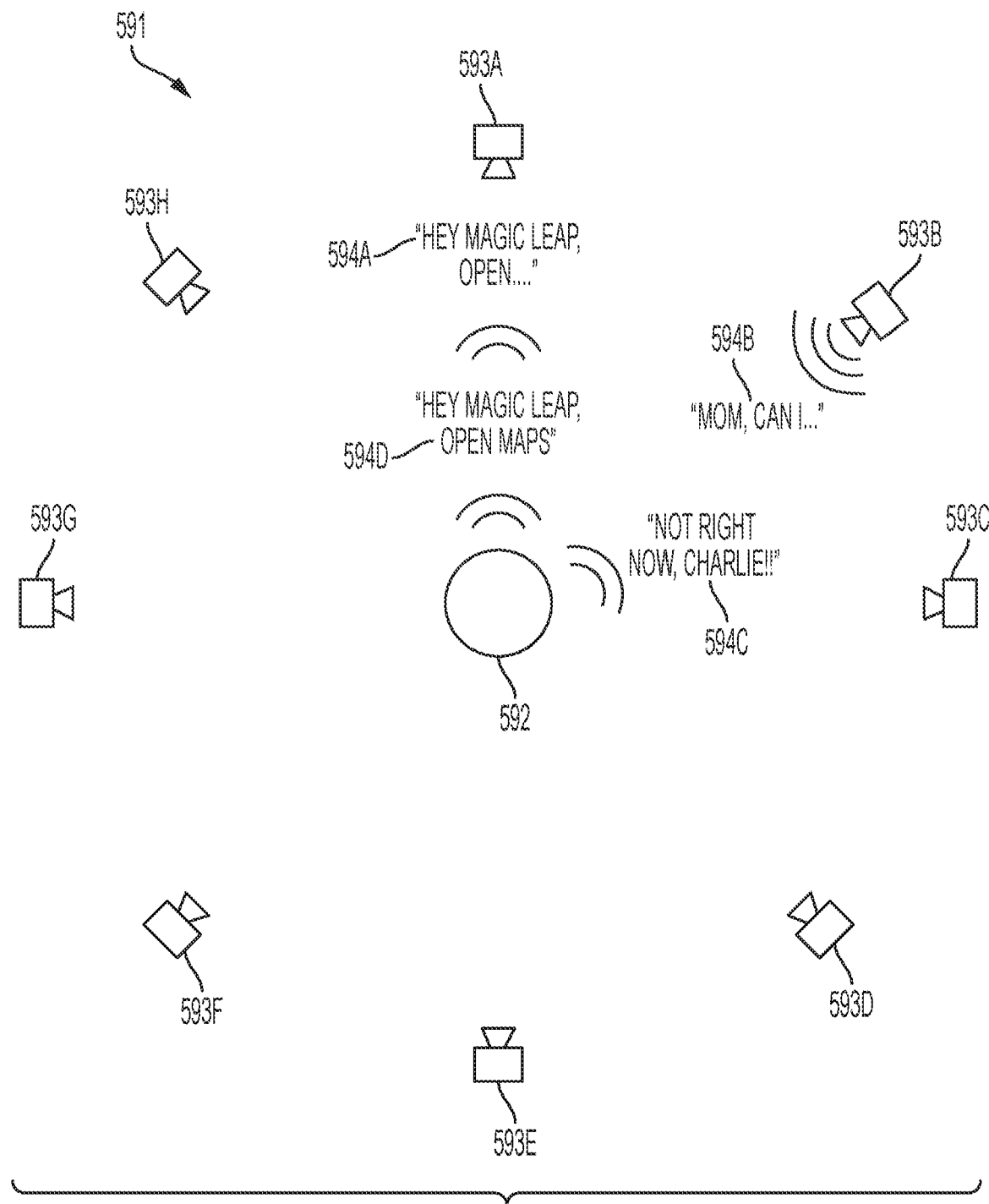
FIG. 11 illustrates an example process for capturing audio and non-audio classifier training data, according to some embodiments of the disclosure.

FIG. 11 illustrates an example environment that can be used to generate audio data and sensor data for classifier training. The figure illustrates test subject 592 (which may correspond to test subject 1012 described above) in an environment 591 that includes a voice target (such as a voice assistant device including a speech processing engine), and one or more "distractor" sources. 593A-593H. The distractor sources are configured to present test subject 592 with audio or visual "distractor" stimuli, to which test subject 592 may respond. Audio data and non-audio data (e.g., sensor data) associated with a response of test subject 592 to these distractor stimuli can be detected; this audio data and non-audio data can describe the response of test subject 592 (as detected by microphones and sensors) to external stimuli presented from the location of the corresponding distractor source. This audio data and non-audio data can be used accordingly to train a classifier (such as described above) to distinguish input speech from non-input speech (e.g., speech directed at an external stimulus, represented by the distractor source).

Distractor sources 593A-593H can be placed at varying distances from and angles to test subject 592, such as shown in the figure. Distractor sources 593A-593H can be presented as speakers or visuals, or as any other suitable object that can produce sound and/or visuals (e.g., human beings, animals, electronic devices, etc.). For example, distractor source 593A can represent a smart home device (e.g., a speaker with an integrated "smart" voice assistant (a "smart speaker")) and distractor source 593B can represent a human; the audio data and non-audio data can reflect differences in the response of test subject 592 based on the apparent identity of the distractor source. Environment 591 can represent a controlled environment (e.g., a sound proof room, or a room in which distractor sources 593A-593H produce sound in a controlled fashion) or an uncontrolled environment (e.g., in the home of test subject 592 or in a public place). For example, in a controlled environment, test subject 592 can freely interact (e.g., with little to no direction or script) with a wearable device with an integrated voice assistant (e.g., wearable head device 100) to instruct the device to perform a particular operation (e.g., open an app, play music, query information, for example, from the Internet, enter information into calendar, read information from a calendar, make a phone call, send a text message, control a smart thermostat, control a smart lock, control one or more smart lights, or any other operation). Test personnel (represented by distractor sources 593A-593H) can engage in conversation with test subject 592. This prompts test subject 592 to interact with wearable device and the test personnel. In some examples, distractor sources 593A-593H can be virtual sources; for example, a software application running on a wearable system can produce sound from one or more virtual sound sources represented by distractor sources 593A-593H. In some examples, distractor sources 593A-593H may be presented via a wearable head device worn by test subject 592 (e.g., via speakers and/or a display of the wearable head device), with audio data and non-audio data potentially captured by microphones and sensors of that same wearable device.

Interactions such as shown in FIG. 11 (e.g., spoken phrases 594A-594D spoken in the environment 591) can be detected and used to train one or more classifiers in accordance with this disclosure. For example, spoken phrases 594A-594D can be recorded (e.g., by one or more microphones 150 on wearable head device 100 or by one or more microphones on sound source 594A) in an audio file as a continuous audio stream: "Hey Magic Leap, open . . . . Mom, can I . . . . Not right now, Charlie . . . open Maps." Similarly, non-audio data of test subject 592 interacting with one or more distractor sources 593A-593H can be captured simultaneously with the audio data. In some examples, data from one or more sensors on a wearable system (e.g., wearable head device 100 in FIG. 1 and/or handheld controller 200 in FIG. 2) on test subject 592 can be used to capture information about the head positions of test subject 592 (e.g., as detected by position and orientation sensors of the wearable head device), hand gestures (e.g., as detected by movements of handheld controller 200 or by one or more cameras 130A and 130B configured on wearable head device 100), eye gaze (e.g., as detected by one or more cameras 128A and 102B configured on wearable head device 100), and/or the distance of test subject 592 from one or more distractor sources 593A-593H (e.g., as measured from the wearable head device 100 to one or more of distractor sources 593A-593H by one or more cameras 130A and 130B and/or GPS, acoustic, radar, or IMU sensors).

With respect to the systems and methods described above, elements of the systems and methods can be implemented by one or more computer processors (e.g., CPUs or DSPs) as appropriate. The disclosure is not limited to any particular configuration of computer hardware, including computer processors, used to implement these elements. In some cases, multiple computer systems can be employed to implement the systems and methods described above. For example, a first computer processor (e.g., a processor of a wearable device coupled to one or more microphones) can be utilized to receive input microphone signals, and perform initial processing of those signals (e.g., signal conditioning and/or segmentation, such as described above). A second (and perhaps more computationally powerful) processor can then be utilized to perform more computationally intensive processing, such as determining probability values associated with speech segments of those signals. Another computer device, such as a cloud server, can host a speech processing engine, to which input signals are ultimately provided. Other suitable configurations will be apparent and are within the scope of the disclosure.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method of presenting a signal to a speech processing engine, the method comprising:
   receiving, via a first microphone of a wearable head device, an audio signal comprising speech from a user of the wearable head device;
   identifying a first portion of the audio signal;
   determining, for the first portion of the audio signal, a first probability that the first portion comprises speech directed by a user as input to the speech processing engine;
   identifying a second portion of the audio signal, the second portion having a start time in the audio signal and an end time in the audio signal, wherein the first portion comprises speech located before the start time in the audio signal and further comprises speech located after the end time in the audio signal;
   determining, for the second portion of the audio signal, a second probability that the second portion comprises speech directed by the user as input to the speech processing engine; and
   in accordance with a determination that the first probability exceeds a first threshold, and further in accordance with a determination that the second probability does not exceed the first threshold:
      presenting the first portion of the audio signal as a first input to the speech processing engine, and forgoing presenting the second portion of the audio signal as an input to the speech processing engine.

2. The method of claim 1, wherein the first probability is determined based on a comparison of the first portion of the audio signal to a plurality of audio signals in a database, each audio signal of the plurality of audio signals associated with a probability that its respective audio signal comprises speech directed as input to the speech processing engine.

3. The method of claim 1, further comprising receiving first sensor data from one or more sensors associated with the wearable head device, wherein the one or more sensors do not include the first microphone.

4. The method of claim 3, wherein the first probability is determined further based on a comparison of the first sensor data to a plurality of sensor data in a database, a sensor data of the plurality of sensor data in the database associated with a respective audio signal and further associated with a probability that the respective audio signal comprises speech directed as input to the speech processing engine.

5. The method of claim 3, wherein the first sensor data is indicative of one or more of a position, an orientation, an eye movement, an eye gaze target, or a vital sign of the user.

6. The method of claim 3, further comprising determining based on the first sensor data whether the first portion of the audio signal corresponds to the user and in accordance with a determination that the audio signal does not correspond to the user, discarding the first portion of the audio signal.

7. The method of claim 1, further comprising determining a query based on the first portion of the audio signal, wherein the first portion of the audio signal forms a portion of the query.

8. The method of claim 1, wherein identifying the second portion of the audio signal comprises determining a boundary between the first portion of the audio signal and the second portion of the audio signal.

9. The method of claim 8, wherein the boundary is determined based on one or more of: a period of silence between speech in the first portion and speech in the second portion, a change in pitch or intonation of the speech, a change in cadence of the speech, or a breathing pattern of the user.

10. The method of claim 8, wherein the boundary is determined based on sensor data from one or more sensors associated with the wearable head device, wherein the one or more sensors do not include the first microphone.

11. A system for providing input to a speech processing engine, the system including:
   a wearable head device comprising a microphone; and
   one or more processors configured to perform:
      receiving, via the microphone, an audio signal comprising speech from a user of the wearable head device;
      identifying a first portion of the audio signal;
      determining, for the first portion of the audio signal, a first probability that the first portion comprises speech directed by a user as input to the speech processing engine;
      identifying a second portion of the audio signal, the second portion having a start time in the audio signal and an end time in the audio signal, wherein the first portion comprises speech located before the start time in the audio signal and further comprises speech located after the end time in the audio signal;
      determining, for the second portion of the audio signal, a second probability that the second portion comprises speech directed by the user as input to the speech processing engine; and in accordance with a determination that the first probability exceeds a first threshold, and further in accordance with a determination that the second probability does not exceed the first threshold:
- presenting the first portion of the audio signal as a first input to the speech processing engine, and
- forgoing presenting the second portion of the audio signal as an input to the speech processing engine.

12. The system of claim 11, wherein the first probability is determined further based on a comparison of the first portion of the audio signal to a plurality of audio signals in a database, a respective audio signal of the plurality of audio signals associated with a probability that the respective audio signal comprises speech directed as input to the speech processing engine.

13. The system of claim 11, further comprising one or more sensors associated with the wearable head device, wherein the one or more processors are further configured to perform:
- receiving first sensor data from the user via the one or more sensors, wherein the first probability is determined further based on a comparison of the first sensor data to a plurality of sensor data in a database, each sensor data of the plurality of sensor data in the database associated with an audio signal and further associated with a probability that its respective audio signal comprises speech directed as input to the speech processing engine.

14. The system of claim 13, wherein the first sensor data is indicative of one or more of a position of the user, an orientation of the user, an eye movement of the user, an eye gaze target of the user, and a vital sign of the user.

15. The system of claim 11, wherein the wearable head device includes the one or more processors.

16. The system of claim 11, wherein the system includes a vehicle including the one or more processors.

17. The system of claim 11, wherein the system includes an electronic voice assistant including the one or more processors.

18. The system of claim 11, wherein identifying the second portion of the audio signal comprises determining a boundary between the first portion of the audio signal and the second portion of the audio signal.

19. The system of claim 18, wherein the boundary is determined based on one or more of: a period of silence between speech in the first portion and speech in the second portion, a change in pitch or intonation of the speech, a change in cadence of the speech, or a breathing pattern of the user.

20. The system of claim 18, wherein the boundary is determined based on sensor data from one or more sensors associated with the wearable head device, wherein the one or more sensors do not include the first microphone.

* * * * *